US011751190B2

(12) United States Patent
Raghavan et al.

(10) Patent No.: US 11,751,190 B2
(45) Date of Patent: Sep. 5, 2023

(54) METHODS FOR POWER SAVINGS WITH MILLIMETER WAVE RELAYS

(71) Applicant: QUALCOMM Incorporated, San Diego, CA (US)

(72) Inventors: Vasanthan Raghavan, West Windsor Township, NJ (US); Tianyang Bai, Bridgewater, NJ (US); Jung Ho Ryu, Fort Lee, NJ (US); Hua Wang, Basking Ridge, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 16/917,003

(22) Filed: Jun. 30, 2020

(65) Prior Publication Data

US 2021/0007104 A1     Jan. 7, 2021

Related U.S. Application Data

(60) Provisional application No. 62/869,810, filed on Jul. 2, 2019.

(51) Int. Cl.
*H04W 72/044* (2023.01)
*H04W 76/14* (2018.01)
(Continued)

(52) U.S. Cl.
CPC ....... *H04W 72/0473* (2013.01); *H04W 72/56* (2023.01); *H04W 76/11* (2018.02); *H04W 76/14* (2018.02); *H04W 92/18* (2013.01)

(58) Field of Classification Search
CPC ............................... H04W 72/0473
See application file for complete search history.

(56) References Cited

U.S. PATENT DOCUMENTS

| 8,503,350 B2 * | 8/2013 | Park | H04B 7/2606 |
| | | | 370/492 |
| 10,531,365 B2 * | 1/2020 | Kaur | H04W 48/10 |

(Continued)

FOREIGN PATENT DOCUMENTS

WO     WO-2018064179 A1     4/2018

OTHER PUBLICATIONS

Mehrdad Shariat et al., "5G Radio Access above 6 GHz", 2016, Transactions on Emerging Telecommunications Technologies, vol. 27, No. 9, pp. 1160-1167 (Year: 2016).*

(Continued)

*Primary Examiner* — Edan Orgad
*Assistant Examiner* — Won Tae C Kim
(74) *Attorney, Agent, or Firm* — Holland & Hart LLP/Qualcomm Incorporated

(57) ABSTRACT

Methods, systems, and devices for wireless communications are described. In one example, a first user equipment (UE) identifies a trigger condition associated with a first communication link with a base station and establishes a second communication link with a second UE. The UE may transmit a relay request to the second UE based on the trigger condition, wherein the relay request instructs the second UE to relay communications for the first UE. The first UE communicates with the base station via the second communication link. In another example, a base station establishes communication links with a first and second UE. The base station receives a data forwarding request that instructs the base station to use the second UE to relay communications between it and the first UE. The base station communicates with the first UE via the second communication link based at least in part on the relay request.

25 Claims, 18 Drawing Sheets

(51) Int. Cl.
*H04W 76/11* (2018.01)
*H04W 72/56* (2023.01)
*H04W 92/18* (2009.01)

(56) References Cited

U.S. PATENT DOCUMENTS

| | | | |
|---|---|---|---|
| 2011/0077013 A1* | 3/2011 | Cho | H04W 72/085 |
| | | | 455/445 |
| 2017/0272364 A1 | 9/2017 | Ishii et al. | |
| 2017/0273119 A1* | 9/2017 | Li | H04W 8/08 |
| 2018/0027429 A1* | 1/2018 | Li | H04W 24/02 |
| | | | 455/426.1 |
| 2018/0049099 A1* | 2/2018 | Lee | H04W 76/14 |
| 2018/0332491 A1* | 11/2018 | Eckardt | H04W 28/0215 |
| 2019/0069247 A1 | 2/2019 | Wu et al. | |
| 2020/0107381 A1* | 4/2020 | Ahmad | H04W 52/0212 |

OTHER PUBLICATIONS

International Search Report and Written Opinion—PCT/US2020/040564—ISA/EPO—dated Oct. 14, 2020.

* cited by examiner

METHODS FOR POWER SAVINGS WITH MILLIMETER WAVE RELAYS

CROSS REFERENCE

The present Application for Patent claims the benefit of U.S. Provisional Patent Application No. 62/869,810 by RAGHAVAN et al., entitled "METHODS FOR POWER SAVINGS WITH MILLIMETER WAVE RELAYS," filed Jul. 2, 2019, assigned to the assignee hereof, and expressly incorporated by reference herein.

BACKGROUND

The following relates generally to wireless communications, and more specifically to methods for power savings with millimeter wave relays.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some 5G systems, wireless devices may have limited battery power or be subject to maximum permissible exposure (MPE) levels that may restrict transmission power levels.

SUMMARY

The described techniques relate to improved methods, systems, devices, and apparatuses that support user equipment (UE) power savings using millimeter wave (mmW) relays. Generally, the described techniques provide for UEs to request and enable relay links between each other and a base station. A UE may monitor parameters and conditions to detect an occurrence of a trigger condition where a relay link may be recommended for a connection between the UE and a base station. The trigger conditions may include, for example, a battery power level, a link budget for a direct communication link being worse than that for the relay link, and beam directionality enabling the use of more desired antenna modules.

If a trigger condition is detected, a UE may poll surrounding UEs to determine if any of them can act as a relay node. The UE may request UE signal reports from the surrounding UEs that indicate transmit power or channel conditions between the UEs and the base station. The UE may use the UE signal reports to select which UE to request to act as a relay node. If a relay request is accepted by the selected UE and the base station, the relay link may be established. The relay link may be a sidelink, which is a device-to-device communication link. The UE and the base station may communicate through the selected UE. The relay link may be canceled upon the trigger condition no longer being valid, a terminating condition at the selected UE, or cancelation by the base station.

A method of wireless communication by a first UE is described. The method may include identifying a trigger condition associated with a first communication link between the first UE and a base station, establishing a second communication link between the first UE and a second UE, transmitting a relay request to the second UE via the second communication link based on the trigger condition, where the relay request includes an instruction for the second UE to relay communications between the first UE and the base station, and communicating with the base station via the second communication link based on the relay request.

An apparatus for wireless communication by a first UE is described. The apparatus may include a processor, memory coupled with the processor, and instructions stored in the memory. The instructions may be executable by the processor to cause the apparatus to identify a trigger condition associated with a first communication link between the first UE and a base station, establish a second communication link between the first UE and a second UE, transmit a relay request to the second UE via the second communication link based on the trigger condition, where the relay request includes an instruction for the second UE to relay communications between the first UE and the base station, and communicate with the base station via the second communication link based on the relay request.

Another apparatus for wireless communication by a first UE is described. The apparatus may include means for identifying a trigger condition associated with a first communication link between the first UE and a base station, establishing a second communication link between the first UE and a second UE, transmitting a relay request to the second UE via the second communication link based on the trigger condition, where the relay request includes an instruction for the second UE to relay communications between the first UE and the base station, and communicating with the base station via the second communication link based on the relay request.

A non-transitory computer-readable medium storing code for wireless communication by a first UE is described. The code may include instructions executable by a processor to identify a trigger condition associated with a first communication link between the first UE and a base station, establish a second communication link between the first UE and a second UE, transmit a relay request to the second UE via the second communication link based on the trigger condition, where the relay request includes an instruction for the second UE to relay communications between the first UE and the base station, and communicate with the base station via the second communication link based on the relay request.

In some examples of the method, apparatuses, and non-transitory computer-readable medium described herein, establishing the second communication link may include operations, features, means, or instructions for transmitting a data forwarding request to the base station via the first communication link or the second communication link, where the data forwarding request includes an instruction for the base station to use the second UE to relay communications between the base station and the first UE.

Some examples of the method, apparatuses, and non-transitory computer-readable medium described herein may further include operations, features, means, or instructions for determining a transmit power usage for the first communication link, where the trigger condition may be based on the transmit power usage.

Some examples of the method, apparatuses, and non-transitory computer-readable medium described herein may further include operations, features, means, or instructions for receiving a signal report from the second UE, where the trigger condition may be further based on the signal report.

In some examples of the method, apparatuses, and non-transitory computer-readable medium described herein, the signal report indicates one of a received signal strength indicator (RSSI), a reference signal received power (RSRP), or a reference signal received quality (RSRQ) for a third communication link between the second UE and the base station.

In some examples of the method, apparatuses, and non-transitory computer-readable medium described herein, identifying the trigger condition further may include operations, features, means, or instructions for determining that a third communication link between the second UE and the base station may have a lower link budget than the first communication link plus the second communication link.

Some examples of the method, apparatuses, and non-transitory computer-readable medium described herein may further include operations, features, means, or instructions for determining a first line-of-sight status condition between the first UE and the base station, and determining a second line-of-sight status condition between the second UE and the base station, where the trigger condition may be based on the first line-of-sight status condition and the second line-of-sight status condition.

In some examples of the method, apparatuses, and non-transitory computer-readable medium described herein, identifying the trigger condition further may include operations, features, means, or instructions for determining that a power level of the first UE may be less than a threshold level.

In some examples of the method, apparatuses, and non-transitory computer-readable medium described herein, identifying the trigger condition further may include operations, features, means, or instructions for determining that the first UE uses a first antenna module for the first communication link and uses a second antenna module different from the first antenna module for the second communication link, where a transmit power used by the first antenna module may be larger than a transmit power used by the second antenna module.

In some examples of the method, apparatuses, and non-transitory computer-readable medium described herein, the first UE uses less antenna modules for the second communication link than for the first communication link.

In some examples of the method, apparatuses, and non-transitory computer-readable medium described herein, the first communication link and the second communication link uses a 6 gigahertz (GHz) frequency band and where the base station may be a gNodeB.

In some examples of the method, apparatuses, and non-transitory computer-readable medium described herein, the communications between the first UE and the base station via the second communication link may be security- or privacy-encoded.

Some examples of the method, apparatuses, and non-transitory computer-readable medium described herein may further include operations, features, means, or instructions for continuing to monitor the at least one trigger condition after establishing the second communication link, determining, based at least on the continued monitoring, that the trigger condition may be currently invalid, and switching back to the first communication link based on the trigger condition being currently invalid.

Some examples of the method, apparatuses, and non-transitory computer-readable medium described herein may further include operations, features, means, or instructions for selecting the second UE from a list of available UEs, and transmitting an identifier of the second UE to the base station via the first communication link or the second communication link.

Some examples of the method, apparatuses, and non-transitory computer-readable medium described herein may further include operations, features, means, or instructions for selecting the second UE from the list of available UEs may be based on at least one of a location of the second UE, a proximity of the second UE, an antenna module used by the first UE for the second communication link, a radio frequency integrated circuit used by the first UE for the second communication link, a direction of a relay link associated with the second communication link, a data size of a payload to communicate via the second UE, a priority associated with the payload, a link budget associated with the second UE, or a combination thereof.

In some examples of the method, apparatuses, and non-transitory computer-readable medium described herein, communicating traffic associated with the second UE with the base station via the second communication link further may include operations, features, means, or instructions for transmitting an identifier of the second UE to the base station via the second communication link.

A method of wireless communication by a first UE is described. The method may include establishing a first communication link between the first UE and a second UE, receiving a relay request from the second UE via the first communication link, where the relay request includes an instruction for the first UE to relay communications between the second UE and a base station, and relaying communications associated with the second UE to the base station via a second communication link between the first UE and the base station based on the relay request.

An apparatus for wireless communication by a first UE is described. The apparatus may include a processor, memory coupled with the processor, and instructions stored in the memory. The instructions may be executable by the processor to cause the apparatus to establish a first communication link between the first UE and a second UE, receive a relay request from the second UE via the first communication link, where the relay request includes an instruction for the first UE to relay communications between the second UE and a base station, and relay communications associated with the second UE to the base station via a second communication link between the first UE and the base station based on the relay request.

Another apparatus for wireless communication by a first UE is described. The apparatus may include means for establishing a first communication link between the first UE and a second UE, receiving a relay request from the second UE via the first communication link, where the relay request includes an instruction for the first UE to relay communications between the second UE and a base station, and relaying communications associated with the second UE to the base station via a second communication link between the first UE and the base station based on the relay request.

A non-transitory computer-readable medium storing code for wireless communication by a first UE is described. The code may include instructions executable by a processor to establish a first communication link between the first UE and a second UE, receive a relay request from the second UE via the first communication link, where the relay request includes an instruction for the first UE to relay communications between the second UE and a base station, and relay communications associated with the second UE to the base station via a second communication link between the first UE and the base station based on the relay request.

Some examples of the method, apparatuses, and non-transitory computer-readable medium described herein may further include operations, features, means, or instructions for transmitting an acceptance message regarding the relay request to the second UE via the first communication link.

Some examples of the method, apparatuses, and non-transitory computer-readable medium described herein may further include operations, features, means, or instructions for transmitting a data forwarding request to the base station via the first communication link or the second communication link, where the data forwarding request includes an instruction for the base station to use the first UE to relay communications between the base station and the second UE.

Some examples of the method, apparatuses, and non-transitory computer-readable medium described herein may further include operations, features, means, or instructions for transmitting a signal report to the second UE, where the relay request may be based on the signal report.

In some examples of the method, apparatuses, and non-transitory computer-readable medium described herein, the signal report indicates one of a received signal strength indicator (RSSI), a reference signal received power (RSRP), or a reference signal received quality (RSRQ) for the second communication link between the first UE and the base station.

Some examples of the method, apparatuses, and non-transitory computer-readable medium described herein may further include operations, features, means, or instructions for determining that a power level of the first UE may be greater than a threshold level, where relaying communications associated with the second UE with the base station via the second communication link may be based on the power level of the first UE being greater than the threshold level.

Some examples of the method, apparatuses, and non-transitory computer-readable medium described herein may further include operations, features, means, or instructions for monitoring for at least one terminating condition after establishing the second communication link, determining, based at least on the monitoring, that the at least one terminating condition may have occurred, and sending a relay cancelation message to the second UE over the first communication link based on the occurrence of the terminating condition.

In some examples of the method, apparatuses, and non-transitory computer-readable medium described herein, the first communication link and the second communication link uses a 6 gigahertz (GHz) frequency band and where the base station may be a gNodeB.

In some examples of the method, apparatuses, and non-transitory computer-readable medium described herein, the traffic associated with the second UE may be security- or privacy-encoded.

A method of wireless communication at a base station is described. The method may include establishing a first communication link between a first UE and the base station, establishing a second communication link between a second UE and the base station, receiving a data forwarding request, where the data forwarding request includes an instruction for the base station to use the second UE to relay communications between the base station and the first UE, and communicating with the first UE via the second communication link based on the relay request.

An apparatus for wireless communication at a base station is described. The apparatus may include a processor, memory coupled with the processor, and instructions stored in the memory. The instructions may be executable by the processor to cause the apparatus to establish a first communication link between a first UE and the base station, establish a second communication link between a second UE and the base station, receive a data forwarding request, where the data forwarding request includes an instruction for the base station to use the second UE to relay communications between the base station and the first UE, and communicate with the first UE via the second communication link based on the relay request.

Another apparatus for wireless communication at a base station is described. The apparatus may include means for establishing a first communication link between a first UE and the base station, establishing a second communication link between a second UE and the base station, receiving a data forwarding request, where the data forwarding request includes an instruction for the base station to use the second UE to relay communications between the base station and the first UE, and communicating with the first UE via the second communication link based on the relay request.

A non-transitory computer-readable medium storing code for wireless communication at a base station is described. The code may include instructions executable by a processor to establish a first communication link between a first UE and the base station, establish a second communication link between a second UE and the base station, receive a data forwarding request, where the data forwarding request includes an instruction for the base station to use the second UE to relay communications between the base station and the first UE, and communicate with the first UE via the second communication link based on the relay request.

Some examples of the method, apparatuses, and non-transitory computer-readable medium described herein may further include operations, features, means, or instructions for transmitting a signal report to the first UE via the first communication link, where the data forwarding request may be further based on the signal report.

In some examples of the method, apparatuses, and non-transitory computer-readable medium described herein, the signal report indicates one of a received signal strength indicator (RSSI), a reference signal received power (RSRP), or a reference signal received quality (RSRQ) for the communication link between the second UE and the base station.

Some examples of the method, apparatuses, and non-transitory computer-readable medium described herein may further include operations, features, means, or instructions for determining a first link budget of the first communication link between the first UE and the base station, determining a second link budget of the second communication link between the second UE and the base station, and communicating information regarding the first link budget and the second link budget via one of the first communication link or the second communication link.

In some examples of the method, apparatuses, and non-transitory computer-readable medium described herein, the first communication link and the second communication link uses a 6 gigahertz (GHz) frequency band and where the base station may be a gNodeB.

In some examples of the method, apparatuses, and non-transitory computer-readable medium described herein, the communications between the first UE and the base station via the second communication link may be security- or privacy-encoded.

Some examples of the method, apparatuses, and non-transitory computer-readable medium described herein may further include operations, features, means, or instructions for monitoring for at least one terminating condition regarding the second communication link, determining, based at least on the monitoring, that the at least one terminating condition may have occurred, and transmitting a relay cancelation message to the second UE over the second communication link based on the occurrence of the terminating condition.

Some examples of the method, apparatuses, and non-transitory computer-readable medium described herein may further include operations, features, means, or instructions for receiving an identifier of the second UE via the first communication link, where establishing the second communication link may be based on receiving the identifier.

Some examples of the method, apparatuses, and non-transitory computer-readable medium described herein may further include operations, features, means, or instructions for identifying a relay flag in the data forwarding request, where the relay flag indicates a reason for requesting a relay, and determining a priority level for the relay request based on the reason for requesting the relay.

DETAILED DESCRIPTION

Figure 1:
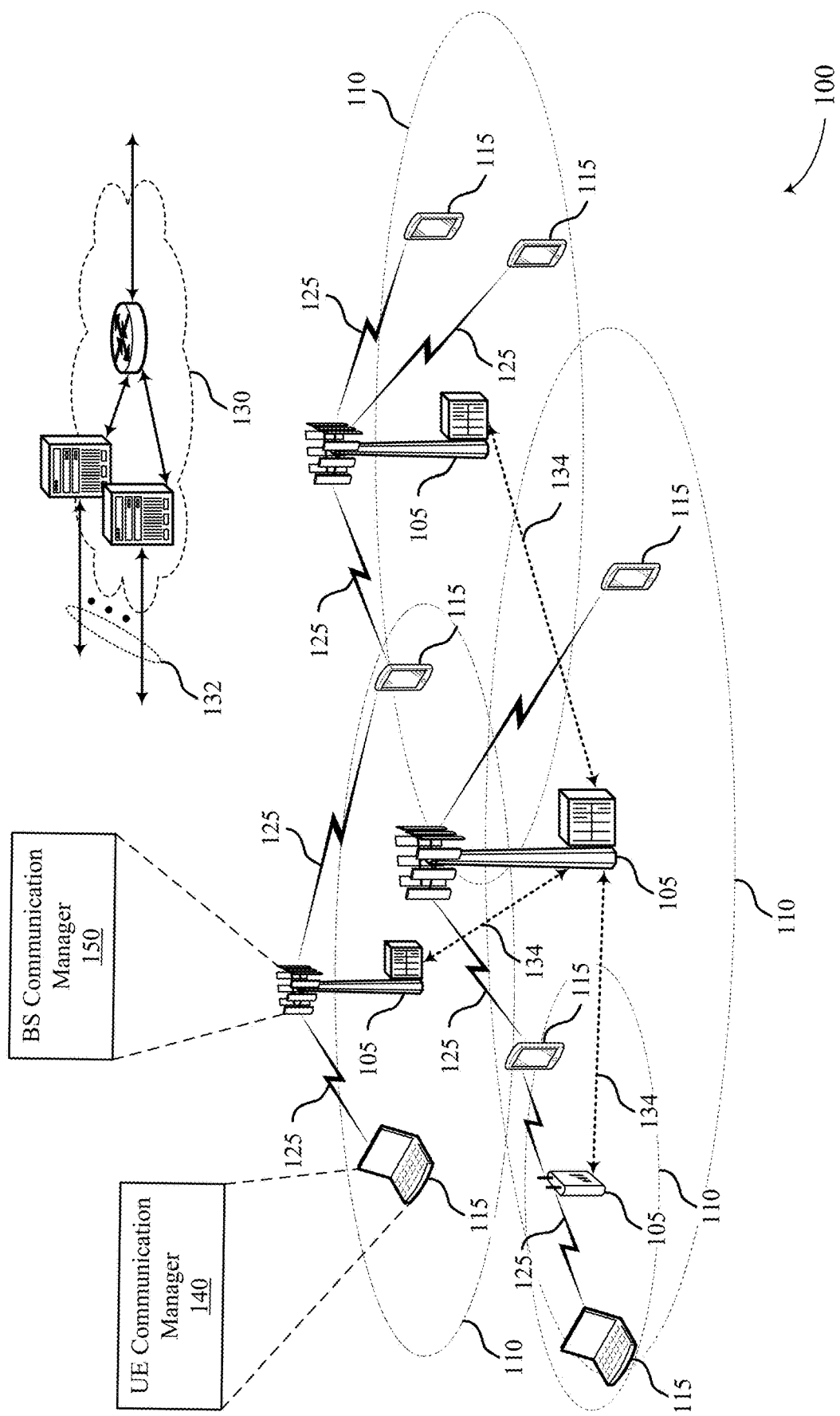
FIG. 1 illustrates an example of a system for wireless communications that supports methods for power savings with millimeter wave (mmW) relays in accordance with aspects of the present disclosure.

Relay methods and systems for millimeter wave (mmW) wireless devices are described herein that can improve power savings at the wireless device, improve performance, and reduce the level of electromagnetic radiation exposure to a user.

New Radio (NR) networks have classified frequency bands for 5G NR, which include frequency regime one (FR1) and frequency regime two (FR2). FR1 is defined as the frequencies between 450 to 6000 MHz and may be referred to as sub-6 GHz. FR2 is defined as 24,250 to 52,600 MHz and may be referred to as mmW. Power consumed at a wireless device may be proportionate to the carrier frequency. Because the carrier frequency for FR2 is higher than those for FR1, transmissions over FR2 may use more power. This increase in power may drain a battery of a device operating on FR2 more than a device operating on FR1. Establishing a relay link may enable communications at a lower transmission power level than that used for a direct communication link, which may result in power savings.

Power savings at a wireless device may be achieved with various approaches. Such approaches include reducing transmission power, which reduces the effective isotropic radiated power (EIRP). Another power saving approach includes dropping carriers in shared access (SA), dual carrier connection involving Evolved Universal Terrestrial Radio Access and New Radio (EN-DC), and other systems. Other ways to improve power savings at a wireless device may include reducing a MIMO rank, reducing the number of antennas used, using a lower order modulation and coding scheme (MCS), switching the antenna module used or RFIC used, or disabling the radio. However, many of these power saving techniques result in dropping features that may not be desired for performance reasons. These power saving techniques may also reduce data rates and lead to poor performance.

In addition, some of the power at a FR2 device may be converted to heat at the wireless device. Some regulations of wireless communications put an upper threshold on the transmission power that an antenna, or antenna module, can use when human tissue is proximate to the antenna. For example, a maximum permissible exposure (MPE) limit may be defined in terms of a maximum power density over a given frequency range. In some example, human tissue may be considered proximate to an antenna when a user holds a wireless communications device at a location over the antenna. Establishing a relay node may enable communications that would otherwise cause the wireless device to exceed the MPE.

To address these and other issues, techniques described herein add an option of a wireless device establishing a relay link directly with another wireless device to provide an alternate path to communicate with a base station. As used herein, a relay link may also be referred to as a sidelink. Using a relay may maintain data rates, performance, and features for the wireless device by enabling lower transmission power or alternative antenna module usage.

In accordance with these techniques, a first wireless device may request a second wireless device to establish a relay link for the first wireless device to communicate with a base station. The first wireless device may send an identifier of the second wireless device to the base station and request that the base station use the relay link with the second wireless device for communications to the first wireless device. The first wireless device may indicate, to the second wireless device, a request for assistance in communications with the base station. If the second wireless device is able to act as a relay node and is incentivized to do so, it may establish the relay link. Signal reports may be used to determine which wireless devices may be available to act as relay nodes.

The first wireless device may request a relay link when it detects a trigger condition. Different trigger conditions may be related to battery levels at the first wireless device, channel conditions between the various devices, MPE limitations, different antenna modules that can be used, location or position estimation, and the like. The first wireless device may monitor for the trigger conditions before establishing a relay link and while using the relay link. If the trigger condition is no longer present, the first wireless device may override the relay link and continue with communications over the established main link.

The second wireless device may accept or deny the request for relay link establishment based on various conditions at the second wireless device. For example, the second wireless device may deny the request if its battery power is too low, if there are poor channel conditions, location or position of node not estimated correctly, lack of incentives, or the like. The second wireless device may cancel a relay link once established if any adverse conditions occur.

One or both of the wireless devices may send a data forwarding request to the base station that indicates the relay link is desired and identifies the first and second wireless devices. The base station may also accept or deny the data forwarding request. The data forwarding request may include a flag which indicates why the relay link is being requested, which may influence or prioritize the acceptance of the request at the base station, as well as the priority the base station gives to the corresponding traffic.

Aspects of the disclosure are initially described in the context of a wireless communications system. Aspects of the disclosure are described in the context of wireless communication subsystems, swim diagrams, and block diagrams. Aspects of the disclosure are further illustrated by and described with reference to apparatus diagrams, system diagrams, and flowcharts that relate to methods for power savings with millimeter wave relays.

FIG. 1 illustrates an example of a wireless communications system 100 that supports methods for power savings with millimeter wave relays in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

Geographic coverage area 110 for a base station 105 may be divided into sectors making up a portion of geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. Wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with core network 130 and with one another. For example, base stations 105 may interface with core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by base station 105 or a receiving device, such as a UE 115) a beam direction for subsequent transmission and/or reception by base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of wireless communications system 100 (e.g., base stations 105 or UEs 115) may have a hardware configuration that supports communications over a particular carrier bandwidth, or may be configurable to support communications over one of a set of carrier bandwidths. In some examples, wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the UEs 115 may include UE communications manager 140, which may perform various functions related to relaying traffic as described herein. For example, UE communications manager 140 may request another UE 115 to act as a relay node for the UE 115. UE communications manager 140 may identify a trigger condition associated with a first communication link between the first UE and a base station and establishing a second communication link between the first UE and a second UE. UE communications manager 140 may also transmit a relay request to the second UE via the second communication link based at least in part on the trigger condition, wherein the relay request comprises an instruction for the second UE to relay communications between the first UE and the base station. UE communications manager 140 may communicate with the base station via the second communication link based at least in part on the relay request.

In another example, UE 115 may receive a request from another UE 115 to act as a relay for the requesting UE 115. In that case, UE communications manager 140 may establish a first communication link between the first UE and a second UE. UE communications manager 140 may receive a relay request from the second UE via the first communication link, wherein the relay request comprises an instruction for the first UE to relay communications between the second UE and a base station. In some examples, UE communications manager 140 may first receive the relay request and then establish the first communication link. UE communications manager 140 may relay communications associated with the second UE to the base station via a second communication link between the first UE and the base station based at least in part on the relay request.

In another example, one or more of the base stations 105 may also include a base station communications manager 150, which may participate in a relay between two UEs 115. In that case, base station communications manager 150 may establish a first communication link between a first UE and the base station and establish a second communication link between a second UE and the base station. Base station communications manager 150 may receive a data forwarding request, wherein the data forwarding request comprises an instruction for the base station to use the second UE to relay communications between the base station and the first UE. Base station communications manager 150 may communicate with the first UE via the second communication link based at least in part on the data forwarding request.

The relaying techniques described herein may improve power savings at one or more UEs 115. That is, a first UE 115 which has a poor signal path may be able to utilize a better path to a second UE 115 which acts as a relay node for the first UE 115. Because transmissions from the first UE 115 have a higher likelihood of reception at the second UE 115 than the base station 105, the first UE 115 may save battery life by using lower transmission power and having to perform less retransmissions. For example, a UE 115 may not have enough battery power to cover a long distance link to a gNB but has sufficient power to cover a short distance link to another UE 115. These scenarios are increasingly relevant for massive MTC (mMTC) and NB-IoT use cases. For example, these techniques may be used by low power sensors communicating with gateways which may relay information to a gNB. Another example includes multiple sensors collaborating with each other in sending information to a remote radio head (RRH), a gNB, or a smart meter, for example. Other examples may also include vehicle-to-vehicle (V2X), vehicle-to-infrastructure, or vehicle-to-everything scenarios. Other examples may include LTE-direct applications.

Millimeter wave radio consumes more power relative to sub-6 GHz radio. This power consumption can lead to large thermal gradients that are to be effectively managed. The techniques described herein may reduce local heating of a mmW device and assist with keeping the device (such as a hand-held mobile device, for example) well within exposure limits. For example, mmW technologies may have more restrictive exposure limits than other types of technologies. These relaying techniques may also reduce interference in a network via adaptive transmissions. For example, interference may be reduced by not transmitting messages with higher power and poorer reception, and instead using a relay link for the transmissions.

Figure 2:
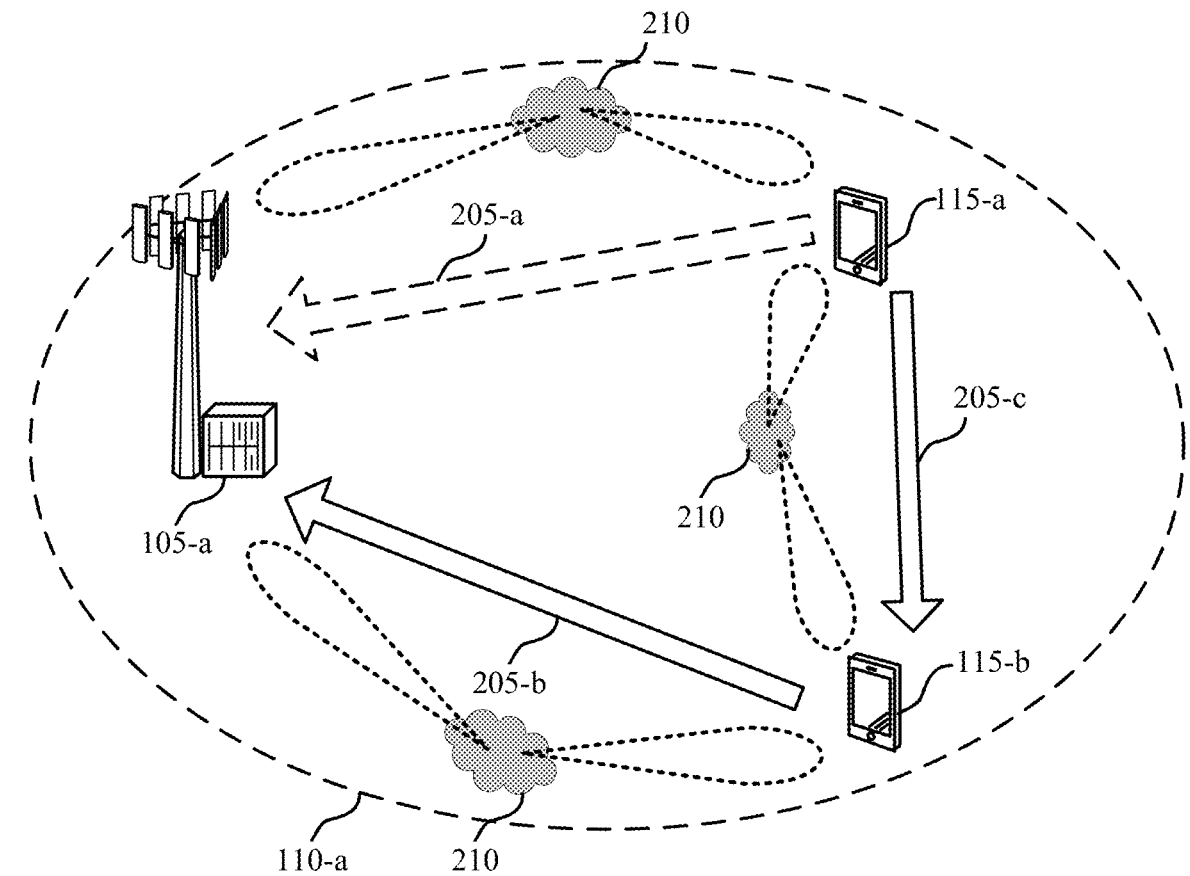
FIG. 2 illustrates an example of a wireless communication subsystem that supports methods for power savings with mmW relays in accordance with aspects of the present disclosure.

FIG. 2 illustrates an example of a wireless communication subsystem 200 that supports methods for power savings with millimeter wave relays in accordance with aspects of the present disclosure. In some examples, wireless communication subsystem 200 may implement aspects of wireless communications system 100. Wireless communications subsystem 200 may include a UE 115-a, a UE 115-b, and a base station 105-a, which may be examples of a UE 115 or a base station 105 as described above with reference to FIG. 1. Wireless communication subsystem 200 may also include a geographic coverage area 110-a, which may be an example of a geographic coverage area 110 as described above with reference to FIG. 1.

Wireless communications subsystem 200 may also include communication links 205-a, 205-b, and 205-c (collectively referred to as communication links 205). The communication link 205-c may also be referred to herein as a sidelink or a relay link. The communications links 205 may represent uplinks and downlinks. Base station 105-a may use a downlink to convey control and data information to UE 115-a. UE 115-a and UE 115-b may use an uplink to convey control and data information to base station 105-a. In some cases, downlinks use different time and/or frequency resources than uplinks.

In the example of FIG. 2, both UE 115-a and UE 115-b are directly connected to base station 105-a. UE 115-a is directly connected to base station 105-a over main communication link 205-a. Likewise, UE 115-b is directly connected to base station 105-b over main communication link 205-b. In some examples, there may be a line-of-sight (LOS) path between one or more of base station 105-a, UE 115-a, and UE 115-b. However, in most scenarios at least one of the paths is not LOS.

Although the communication links 205 are shown in FIG. 2 as straight paths for illustrative purposes, communication links 205 may actually follow bent paths which reflect off one or more clusters 210. A cluster 210 may be any type of reflective object, such as a window, a metallic object, a glass structure, or the like. The presence of clusters 210 may influence a beam path choice (e.g., a "best" beam path among the beam path options), which antennas may be utilized for transmissions, and the relay techniques described herein. Each UE 115 may select which antenna modules and beams to use for each communication link 205.

Communication link 205-a represents a main path or main communication link for UE 115-a to communicate with base station 105-a. However, in some situations, UE 115-a may want to establish a relay link with another UE 115, such as UE 115-b. The relay link may include communication link 205-b between UE 115-a and UE 115-b, as well as the communication link 205-c between UE 115-a and UE 115-b.

Reasons why UE 115-a may initiate a relay link with UE 115-b may include, but are not limited to, power savings, improved connectivity, assisted or cooperative communication, link recovery, or the like.

In a scenario where a communication link 205-c with UE 115-b provides an alternate path, which may use different clusters 210, to communicate with base station 105-a, UE 115-a may indicate an identifier of UE 115-b to base station 105-a and request to use communication link 205-c via UE 115-b for communications with base station 105-a. UE 115-a may indicate a request for assistance in its communications to base station 105-a to UE 115-b. If accepted and established, UE 115-a and UE 115-b may use communication link 205-c to complete an information exchange with base station 105-a.

Figure 3:
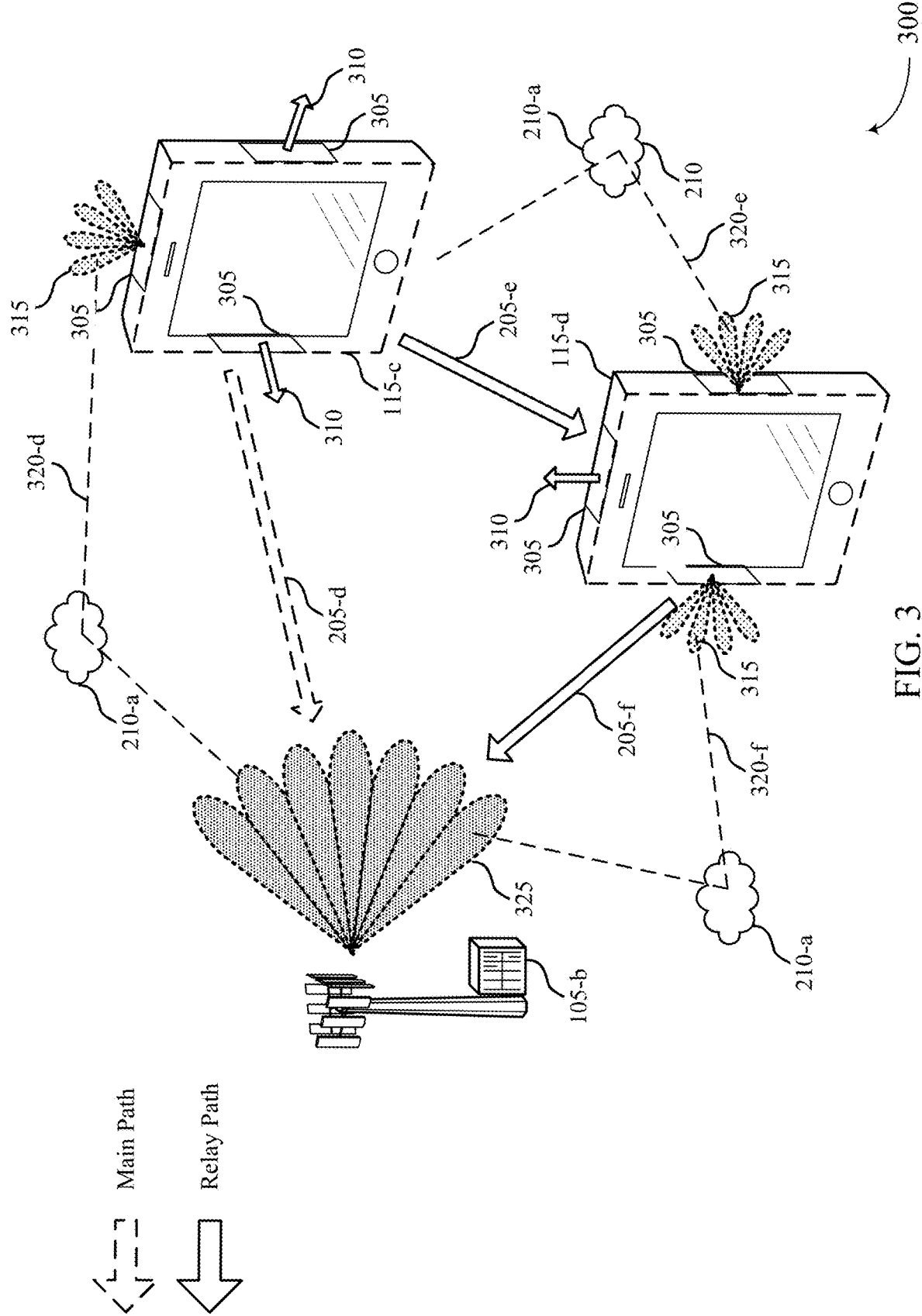
FIG. 3 illustrates an example of another wireless communication subsystem that supports methods for mmW relays in accordance with aspects of the present disclosure.

FIG. 3 illustrates an example of a wireless communications subsystem 300 that supports methods for power savings with millimeter wave relays in accordance with aspects of the present disclosure. In some examples, wireless communications subsystem 300 may implement aspects of wireless communications system 100 or wireless communications subsystem 200 of FIGS. 1 and 2, respectively. Wireless communications subsystem 300 may include a UE 115-c, a UE 115-d, and a base station 105-b, which may be examples of a UE 115 or a base station 105 as described above with reference to FIGS. 1 and 2.

UE 115-c may have established communications with base station 105-b via communication link 205-d. Communication link 205-d may be a direct link with base station 105-b because the base station 105-b receives the original transmissions from UE 115-c, and vice-versa. In other words, a direct link may not have any intervening relay between the transmitter and the intended recipient. Likewise, UE 115-d may have established communications with base station 105-b via communication link 205-f. Although communication links 205-d, 205-e, and 205-f are represented in FIG. 3 as straight paths, paths 320-d, 320-e, and 320-f with clusters 210-a, respectively, may be more representative of the actual path.

UEs 115 may include multiple antenna modules 305. A UE 115 may include multiple antenna modules 305 instead of just a single antenna module in order to improve transmission and reception coverage around the UE 115. The multiple antenna modules 305 may provide spherical or nearly spherical coverage around the UE 115. In some examples, a UE 115 may have multiple antenna modules 305 positioned around the periphery or edge of the UE 115. In the example of FIG. 3, UEs 115-c and 115-d each have three antenna modules 305 located on each of the outside edges, with the exception of the bottom edge. Antenna modules 305 each have an orthogonal direction of propagation 310 and one or more beams 315.

Each antenna module 305 may be driven by an independent radio frequency integrated circuit (RFIC). Each antenna module 305 may be controlled by an RFIC with different antenna feeds which correspond to different physical antennas. Radio frequency chains may be switched across different RFICs. In some examples, such as NR, many antennas are packed into each antenna module 305 for coverage and performance reasons. An antenna module 305 may include a full antenna array and extend at least partially along a long edge of a UE 115. In some examples, having more antenna modules 305 to choose from for a communication link may improve a link budget.

UEs 115 may determine which beam 315 is the best beam to use for a communication link 205. The best beam 315 to use may be based on directionality or the type of antenna in the antenna module 305. Different antenna types may have different power usages and different directionalies. Antenna modules 305 may be dipole or patch antennas, for example. In other examples, UEs 115 include other types of antenna modules 305. Likewise, base station 105-b may determine which is the best beam 325 for it to use to transmit to UEs 115.

It also may be possible to use a smaller number of antennas in one antenna module to reduce power consumption. For example, in a typical FR2 design, a patch antenna may consume a single antenna feed while a dipole antenna consumes two antenna feeds because of its differential design. In some examples, turning on a certain antenna feed for the purpose of beamforming may come at a cost of turning on multiple radio frequency (RF) blocks that are associated with the turning on process for that antenna feed. Some RF blocks are independent for every antenna feed and some are shared across antenna feeds. Some RF blocks are present in the receive only paths, some blocks are in transmit only paths, or some blocks are shared across receive and transmit paths. Because of these design features, a 4×1 dipole antenna could consume more power than a 4×1 patch array, for example. That is, in some cases, the 4×1 dipole antenna could consume nearly twice as much transmit and receive power as a 4×1 patch array. Therefore, choosing communication links where a 4×1 patch array can be used may result in power savings over communication links where a 4×1 dipole must be used. Also, using a smaller number of antennas may useless power than a larger number of antennas.

UE 115-c may determine whether it will save power when using a relay link based at least in part on link budgets. Each communication link 205 may have an associated link budget. In a wireless communication system, a link budget may be an accounting of all the gains and losses from a transmitter through a medium to a receiver. In wireless communication systems, a medium may contain free space (e.g., air or vacuum), buildings and other structures, foliage, humans, vehicles, or other objects. Having a line-of-sight between the transmitter and receiver (e.g., the medium includes mainly free space) may result in better link budgets than those with many obstacles. Signals may penetrate the objects in the medium, but path loss will likely occur with each penetration.

Each communication link 205 may also be associated with a path loss exponent (PLE). A PLE defines how much a signal-to-noise ratio (SNR) of a communication link 205 degrades due as a function of distance. A larger PLE indicates more signal degradation than a smaller PLE. For example, a longer path may have a worse PLE than a shorter path, due to attenuation and a greater likelihood of the presence of obstacles in the longer path. However, a path that has a dominant reflector, such as a highly reflective glass or metallic object, may have a smaller PLE than a shorter path without such a reflector. Typically, in mmW communication systems, a shorter distance results in a smaller PLE and a larger distance may have a larger PLE. The path loss as a function of distance may follow a piecewise linear model.

The link budgets for each communication link 205 may be determined, either by the transmitter or by the receiver. The link budgets may be calculated, estimated, measured, or modeled. However, for illustrative purposes, consider that each communication link 205-d (UE 115-c to base station 105-b), 205-e (i.e., the sidelink between UE 115-c to UE 115-d), and 205-e (UE 115-d to 105-b) has a respective minimum transmission power of $Tx_1$, $Tx_2$, and $Tx_3$, respectively. The path distance for communication link 205-d (given as $d_1$) will be less than or equal to the path distance for communication link 205-3 (given as $d_2$) plus the path distance for communication link 205-e (given as $d_3$). That is, $d_1 \leq d_2 + d_3$. If all of the three communication links 205 are LOS or have the same PLE, it would be expected that $Tx_1 \leq Tx_2 + Tx_3$. In this scenario, there would be no power savings for using a relay node. However, the relay link may be useful in many other scenarios.

For example, if the link budget for communication link 205-e (UE 115-c to UE 115-d) has a better link budget or SNR than communication link 205-d (UE 115-c to base station 105-b), then $Tx_1 > Tx_2 + Tx_3$. In that case, using UE 115-d as a relay for UE 115-c will result in power savings. Such a scenario may arise when communication link 205-e is LOS while communication link 205-d is not LOS. To determine whether a relay link would result in power savings, UE 115-c may model the path loss as a function of distance in terms of decibels (dB) using a piecewise linear model, with smaller PLEs for shorter distances and larger PLEs for larger distances. In the model, shorter distances can use a LOS or near-LOS mode of communication whereas longer distances can see communications via multiple bounces, reflections, or wall penetrations, for example. In other examples, other models may be used to determine the link budgets.

Generally, two shorter paths may be better than a single, longer path. However, this general rule may be frequency dependent. For example, piecewise linear path loss may be more common using some frequencies than others. In one example, FR2 may have PLEs that follow a piecewise linear model more often than in FR1. Furthermore, the power savings in mmW may be large enough to warrant the use of relay links in FR2 over FR1.

Techniques described herein enable a wireless device to establish a relay link when a user is at risk of being exposed to the MPE if the wireless device were to use a main link. The wireless device may determine that a transmission power restriction applies to an antenna module or serving beam pair associated with the main link. The transmission power restriction may prevent the wireless device from transmitting using a power higher than the transmission power restriction because a user is contacting the housing proximate to or over the antenna module. The wireless device can establish a relay link using techniques described herein in order to use a different antenna module that would not expose the user to the MPE or to use lower transmission power. Using a different antenna module, which also may include using a lower transmission power, via a relay link may keep the user from being exposed to the MPE. These methods can enable the wireless device to stay within the MPE limits, reduces potential exposure of the user, improves battery life, and does not degrade receive performance by using a relay link.

Figure 4:
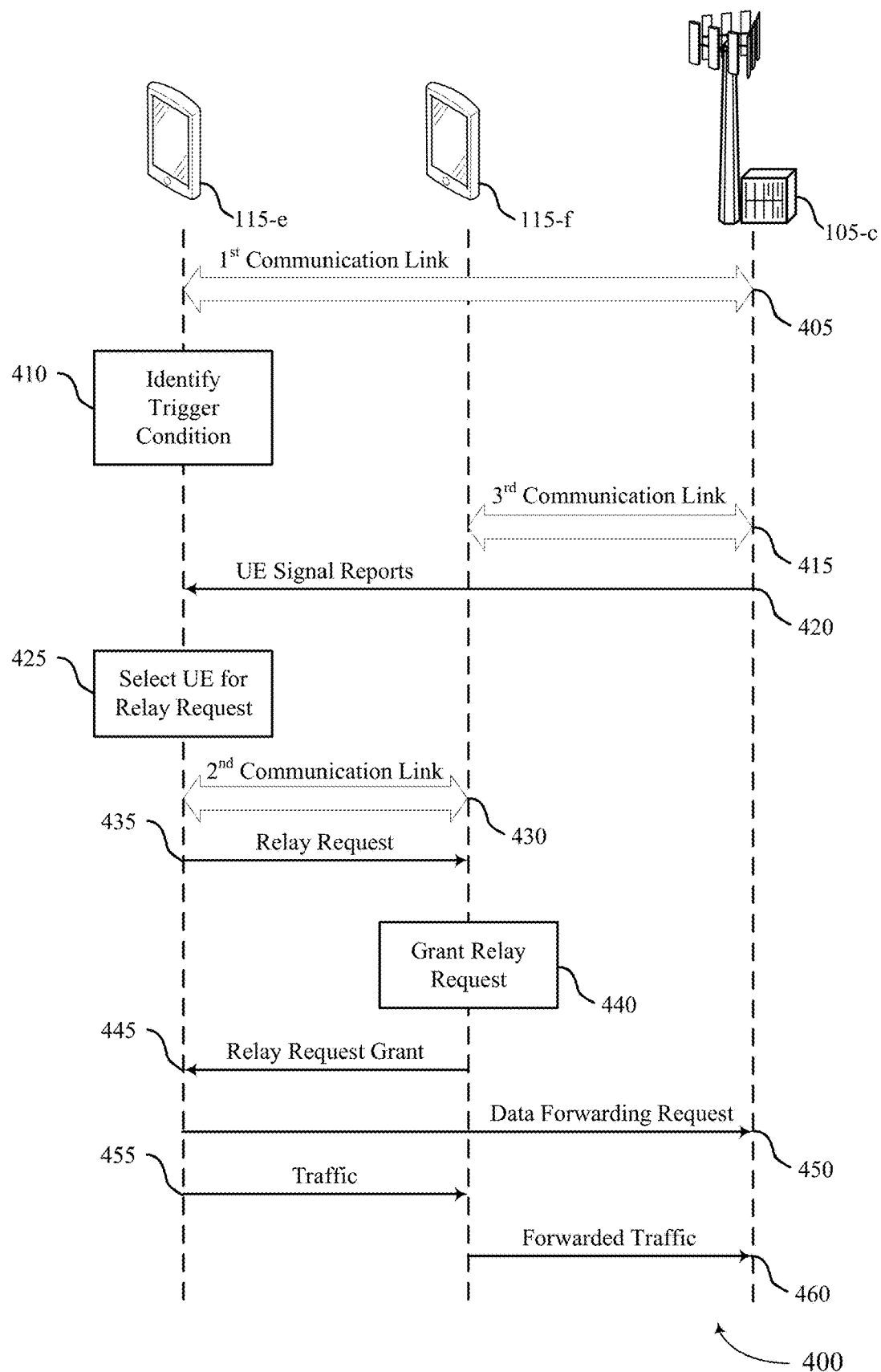
FIG. 4 illustrates an example of a diagram that supports methods for power savings with mmW relays in accordance with aspects of the present disclosure.

FIG. 4 illustrates an example of a diagram 400 that supports methods for power savings with millimeter wave relays in accordance with aspects of the present disclosure. In some examples, diagram 400 may implement aspects of wireless communications system 100. In some examples, diagram 400 may implement aspects of wireless communications system 100 or wireless communication subsystems 200 and 300 of FIGS. 1-3. Diagram 400 may include a UE 115-e, a UE 115-f, and a base station 105-c, which may be examples of a UE 115 or a base station 105 as described above with reference to FIGS. 1-3.

UE 115-e may establish a first communication link 405 with base station 105-c. The first communication link 405 may incorporate uplink and downlink traffic. At 410, UE 115-*e* identifies a trigger condition for initiating a relay link. The trigger condition may be associated with first communication link 405. Examples of trigger conditions may include a high PLE on first communication link 405, low battery power at UE 115-*e* (e.g., battery power is below a threshold level), a better link budget for a communication link to UE 115-*f* than between UE 115-*e* and base station 105-*c*, or more power savings in transmitting to or receiving from UE 115-*e* than in direct communications with base station 105-*c*.

In an example where the trigger condition is related to battery power, UE 115-*e* may not have enough battery power to cover a long distance communication link to base station 105-*c*, but has sufficient power to cover a short distance communication link to UE 115-*f* That is, the hop through UE 115-*f* uses less power at UE 115-*e* than a direct communication link to base station 105-*c*. When the battery power is at or below a threshold level, UE 115-*e* may search for neighboring UEs, such as UE 115-*f*, to act as a relay for its communications with base station 105-*c*. In some example, the neighboring UEs may include a set of UEs that have communication links established with base station 105-*c*. In other examples, the neighboring UEs may be proximate to UE 115-*e*, or within a threshold distance from UE 115-*e*. In yet another example, the neighboring UEs may be within a geographic coverage area of base station 105-*c*.

Another trigger condition may be based on the antenna modules of UE 115-*e*. For example, some subarrays in a mmW antenna module may consume more transmit and receive power than other subarrays. For example, a 4×1 dipole array can consume more power than a 4×1 patch array due to their designs. A dipole antenna module may have differential feeds while a patch antenna module may not include differential feeds. A trigger condition may exist when a patch antenna module may be useable with a relay link while only a dipole antenna module is usable for the direct link. This trigger condition may apply for FR2 UEs 115 or UEs 115 with RFIC constraints.

In other examples, other types of trigger conditions may exist. Examples may include receiving a request to act as a relay node from a neighboring UE 115, an instruction to use a relay link from a base station 105, a congestion level, an upcoming or occurring weather event, a mobile condition of the UEs 115, or the like.

UE 115-*f* may establish a third communication link 415 with base station 105-*c*. In some examples, UE 115-*f* has established third communication link 415 earlier or later (such as after receiving a relay request). In some examples, UE 115-*f* establishes third communication link 415 with base station 105-*c* before UE 115-*e* establishes first communication link 405 with base station 105-*c*.

Base station 105-*c* may send UE signal reports 420 to UE 115-*e*. The UE signal reports 420 may include signal information, such as an RSSI or RSRP, for those UEs 115 that neighbor UE 115-*e*. In some examples, base station 105-*c* sends UE signal reports 420 when requested by UE 115-*e*, which may request UE signal reports 420 upon detection of a trigger condition. In other examples, base station 105-*c* periodically sends UE signal reports 420, or sends them based upon another occurrence. In other examples, the UEs 115 themselves send UE signal reports 420 instead of base station 105-*c*. For example, UE 115-*f* may send its own UE signal report 420 to UE 115-*e*. This may occur periodically, upon request, or based upon another occurrence. In some examples, UE 115-*e* may poll other UEs 115 for their RSSI or RSRP. In yet other examples, UE 115-*e* may scan its area to determine if there are other UEs 115 that are closer to base station 105-*c* and may be able to act as a relay node for UE 115-*e*.

At 425, UE 115-*e* may select a UE to act as a relay node for its communications with base station 105-*c*. The selection may be based at least upon one or more of UE signal reports 420, proximity of the UEs to UE 115-*e*, power levels of the UEs, the presence of a flag in a signal associated with the UE 115-*f* indicating that it is available to act as a relay node, an LOS condition of the UE 115-*f*, or the like.

In this example, UE 115-*e* has selected UE 115-*f* to request if it can act as a relay node. UE 115-*e* establishes a second communication link 430 with UE 115-*f*, and sends a relay request 435 to UE 115-*f*. Relay request 435 requests UE 115-*f* to act as a relay node for communications between UE 115-*e* and base station 105-*c*. Relay request 435 may include a flag that indicates why UE 115-*e* is requesting the relay (e.g., UE 115-*e* is low on power, has emergency or mission-critical communications, has a poor link budget for a direct communication, etc.).

At 440, UE 115-*f* may determine whether it is going to grant the relay request. UE 115-*f* may determine whether to act as a relay node based on one or more of a battery power level at UE 115-*f*, incentives for acting as a relay node (e.g., discounts available from the network, increased bandwidth allowances, priority given to its traffic, etc.), location, or other reasons. If UE 115-*f* decides to grant relay request 435, it sends a relay request grant 445 to UE 115-*e*.

UE 115-*e* may send a data forwarding request 450 to base station 105-*c*. Alternatively, UE 115-*f* may send the data forwarding request 450 to base station 105-*c*. Data forwarding request 450 may include an instruction for base station 105-*c* to use UE 115-*f* to relay communications between base station 105-*c* and UE 115-*e*. Data forwarding request 450 may include a flag that indicates why UE 115-*e* is requesting the relay (e.g., UE 115-*e* is low on power, has emergency or mission-critical communications, has a poor link budget for a direct communication, etc.). Base station 105-*c* may give different priority levels to the traffic based on the reason indicated via the flag. Base station 105-*c* may accept or deny data forwarding request 450. If base station 105-*c* accepts the data forwarding request, it may send an acceptance message to either or both UE 115-*e* and 115-*f*, or just begin communicating with UE 115-*e* via UE 115-*f*.

Once the relay link has been established, UE 115-*e* may send traffic 455 to UE 115-*f*. UE 115-*e* may send forwarded traffic 460 that is based on traffic 455 to base station 105-*c*. In some examples, forwarded traffic 460 is the same as traffic 455. In other examples, UE 115-*f* may decode, extract, or recode the forwarded traffic 460. UE 115-*f* may add or remove data from the forwarded traffic 460. In some cases, the communications between UE 115-*f* and base station 105-*c* via the third communication link 415 are security- or privacy-encoded.

Figure 5:
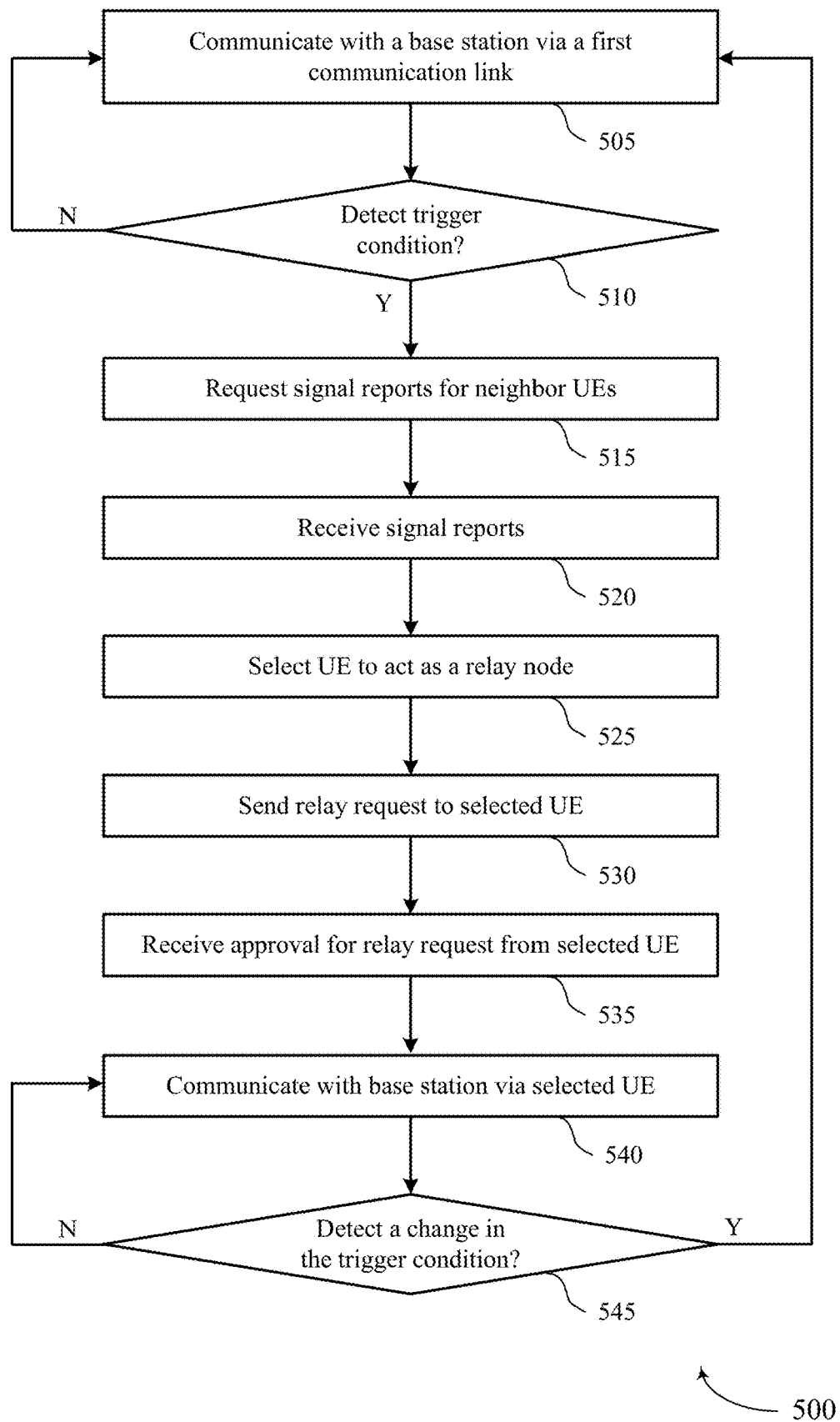
FIG. 5 shows a flowchart illustrating a method for requesting a mmW relay in accordance with aspects of the present disclosure.

FIG. 5 illustrates an example of a method 500 for requesting a mmW relay in accordance with aspects of the present disclosure. In some examples, method 500 may implement aspects of wireless communications systems 100. The operations of method 500 may be implemented by a UE 115 or its components as described herein. For example, the operations of method 500 may be performed by a UE communications manager 140 as described with reference to FIGS. 1 and 8 through 11. In some examples, a UE 115 may execute a set of instructions to control the functional elements of the UE 115 to perform the functions described below. Additionally or alternatively, a UE 115 may perform aspects of the functions described below using special-purpose hardware. The operations of method 500 may be performed according to the methods described herein.

At 505, a UE may communicate with a base station via a first communication link. The UE may communicate with the base station over the first communication link. However, in some examples, the UE may not yet have established a first communication link when it detects a trigger condition for such a link. In that case, the UE may establish a relay link without actually having a first communication link.

At 510, the UE may check for the occurrence of a trigger condition (battery level, better link budget using a relay link, better antenna modules to be used, etc.). If there is not a trigger condition occurring, the UE may continue to communicate with the base station via the first communication link at 505. If, however, a trigger condition is detected, method 500 proceeds to 515. At 515, the UE requests a signal reports for neighboring UEs. The signal reports may be requested from the UEs themselves or from the base station. At 520, the UE receives the signal reports. In some cases, the signal report indicates one of a received signal strength indicator (RSSI), a reference signal received power (RSRP), or a reference signal received quality (RSRQ) for a third communication link between the second UE and the base station. In some cases, the signal report indicates one of an RSSI, a RSRP, or a RSRQ for the second communication link between the first UE and the base station.

At 525, the UE may determine which UE among the neighboring UEs to request to be a relay. This determination may be made based at least in part on the received signal reports. At 530, the UE may send a relay request to the selected node.

The UE may receive an acceptance of the relay request from the selected node at 535. Upon receiving the request and the establishment of the relay link, the UE may begin to communicate with the base station via the selected UE at 540.

At 545, the UE monitors for a change in the trigger condition. A change in the trigger condition may include changes to battery power, LOS conditions, location of the UE, orientation of the UE, and the like. For example, the UE may have been charging its battery, and now the power level is above the threshold amount. In another example, the UE may have been oriented such that a patch antenna may now be used for a direct communication link with the base station. In yet another example, the link budgets may have changed for the direct link versus the relay link. If the trigger condition has not changed (i.e., the trigger condition is still present), the UE continues to communicate with the base station via the selected UE at 540. However, if the trigger condition has changed, the UE cancels the relay link and begins to communicate with the base station over the first link.

Figure 6:
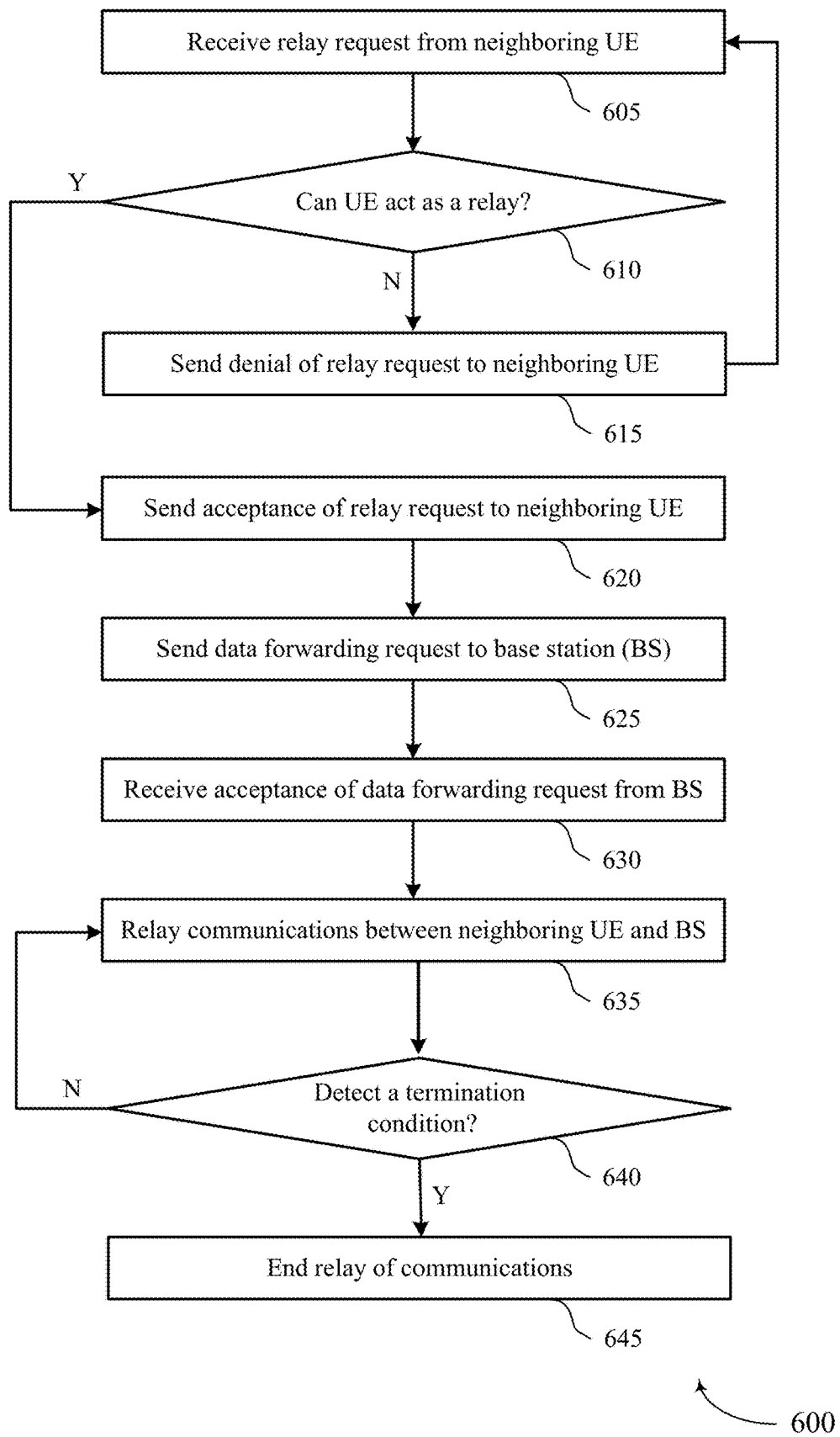
FIG. 6 shows a flowchart illustrating a method for acting as a mmW relay in accordance with aspects of the present disclosure.

FIG. 6 illustrates an example of a method 600 for acting as a mmW relay node in accordance with aspects of the present disclosure. In some examples, method 600 may implement aspects of wireless communications system 100. The operations of method 600 may be implemented by a UE 115 or its components as described herein. For example, the operations of method 600 may be performed by a UE communications manager 140 as described with reference to FIGS. 1 and 8 through 11. In some examples, a UE 115 may execute a set of instructions to control the functional elements of the UE 115 to perform the functions described below. Additionally or alternatively, a UE 115 may perform aspects of the functions described below using special-purpose hardware. The operations of method 600 may be performed according to the methods described herein.

At 605, the UE may receive a relay request from a neighboring UE. The relay request may include a flag that indicates why the neighboring UE is requesting the relay. At 610, the UE determines whether it can act as a relay between the neighboring UE and the base station. Factors the UE may consider include a battery level at the UE, available bandwidth, LOS conditions, traffic generated by a user of the UE, a communication mode of the UE, a reason for the UE to request the relay, or the like. If the UE does not accept the relay request, it sends a denial of the request to the neighboring UE at 615. If the UE is available and willing to act as a relay node, the UE sends an acceptance of the relay request to the neighboring UE at 620.

At 625, the UE may send a data forwarding request to the base station that indicates that it wants to act as a relay node between the neighboring UE and the base station. In other examples, the neighboring UE sends the data forwarding request. The data forwarding request may include a flag that indicates why the relay is being requested.

At 630, the UE may receive acceptance of the data forwarding request from the BS. In examples where the UE did not send the data forwarding request, the UE may not receive an acceptance from the base station. In other examples, if the UE does not receive an acceptance of the data forwarding request within a predetermined time period, the UE sends a denial of the relay request to the neighboring UE.

Once acceptance of the relay link by the base station has been determined, the UE may relay communications between the neighboring UE and the base station at 635. In some cases, the communications between the neighboring UE and the base station via the second communication link are security- or privacy-encoded.

The UE may continuously or periodically monitor itself to detect a terminating condition for the relay link at 640. A terminating condition may include a battery level at the UE being below a threshold level, a change in the location of the UE, a change in data traffic at the UE, a change in an incentive for acting as a relay node, a change in channel conditions such as no longer having a LOS condition, a cancelation message for the relay link from either or both of the neighboring UE or the base station, or the like. If the UE detects a termination condition, it ends the relay of the communications and sends a cancellation message to one or both of the neighboring UE and the base station at 645. If the UE does not detect a termination condition, it continues to relay communications between the neighboring UE and the base station at 635.

Figure 7:
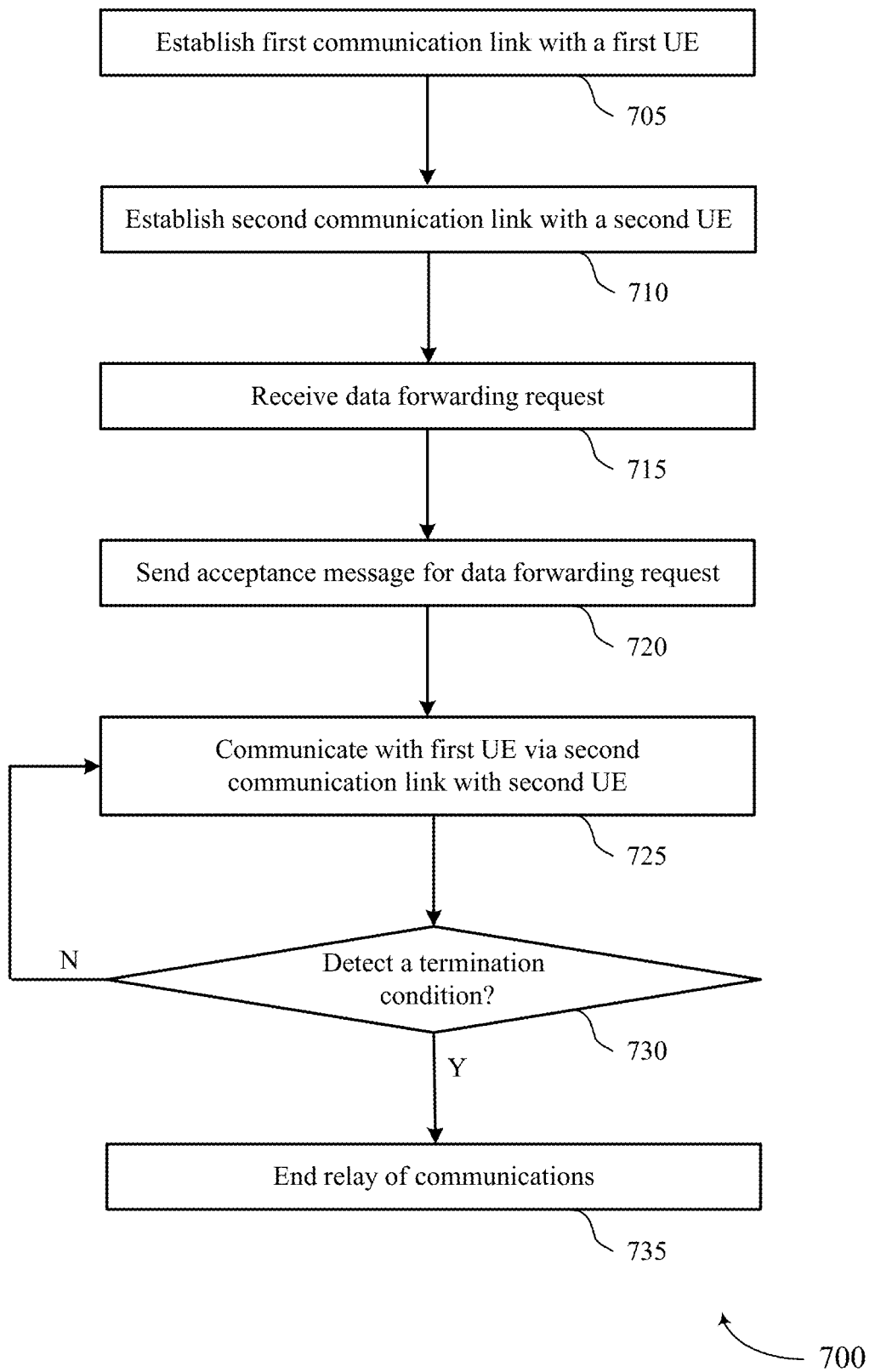
FIG. 7 shows a flowchart illustrating a method for data forwarding in mMW relays in accordance with aspects of the present disclosure.

FIG. 7 illustrates an example of a method 700 that supports methods for power savings with millimeter wave relays in accordance with aspects of the present disclosure. In some examples, method 700 may implement aspects of wireless communications system 100. The operations of method 700 may be implemented by a base station 105 or its components as described herein. For example, the operations of method 700 may be performed by a base station communications manager 150 as described with reference to FIGS. 1 and 12 through 15. In some examples, a base station 105 may execute a set of instructions to control the functional elements of the base station 105 to perform the functions described below. Additionally or alternatively, a base station 105 may perform aspects of the functions described below using special-purpose hardware. The operations of method 700 may be performed according to the methods described herein.

At 705, the base station may establish a first communication link with a first UE. At 710, the base station may establish a second communication link with a second UE. In some examples, one or both of these communication links are not established until after a data forwarding request is received at the base station.

At 715, the base station may receive a data forwarding request that requests the second UE to be able to act as a relay node for the first UE. If the base station can accept the relay situation, it may send an acceptance message for the data forwarding request to whichever UE sent it at 720.

The base station may communicate with the first UE via the relay link established with the second UE at 725. At 730, the base station monitors for a termination condition for the relay link. The base station may continuously or periodically monitor itself to detect a terminating condition for the relay link. A terminating condition may include a battery level at the second UE being below a threshold level, a change in the location of the second UE, a change in data traffic at the second UE, a change in channel conditions such as no longer having a LOS condition with the second UE or having a LOS condition with the first UE, a cancelation message for the relay link from either or both of the UEs, or the like. If the base station detects a termination condition, it ends the relay of the communications and sends a cancellation message to one or both of the UEs at 735. If the base station does not detect a termination condition, it continues to communication with the first UE via the second UE at 725.

Figure 8:
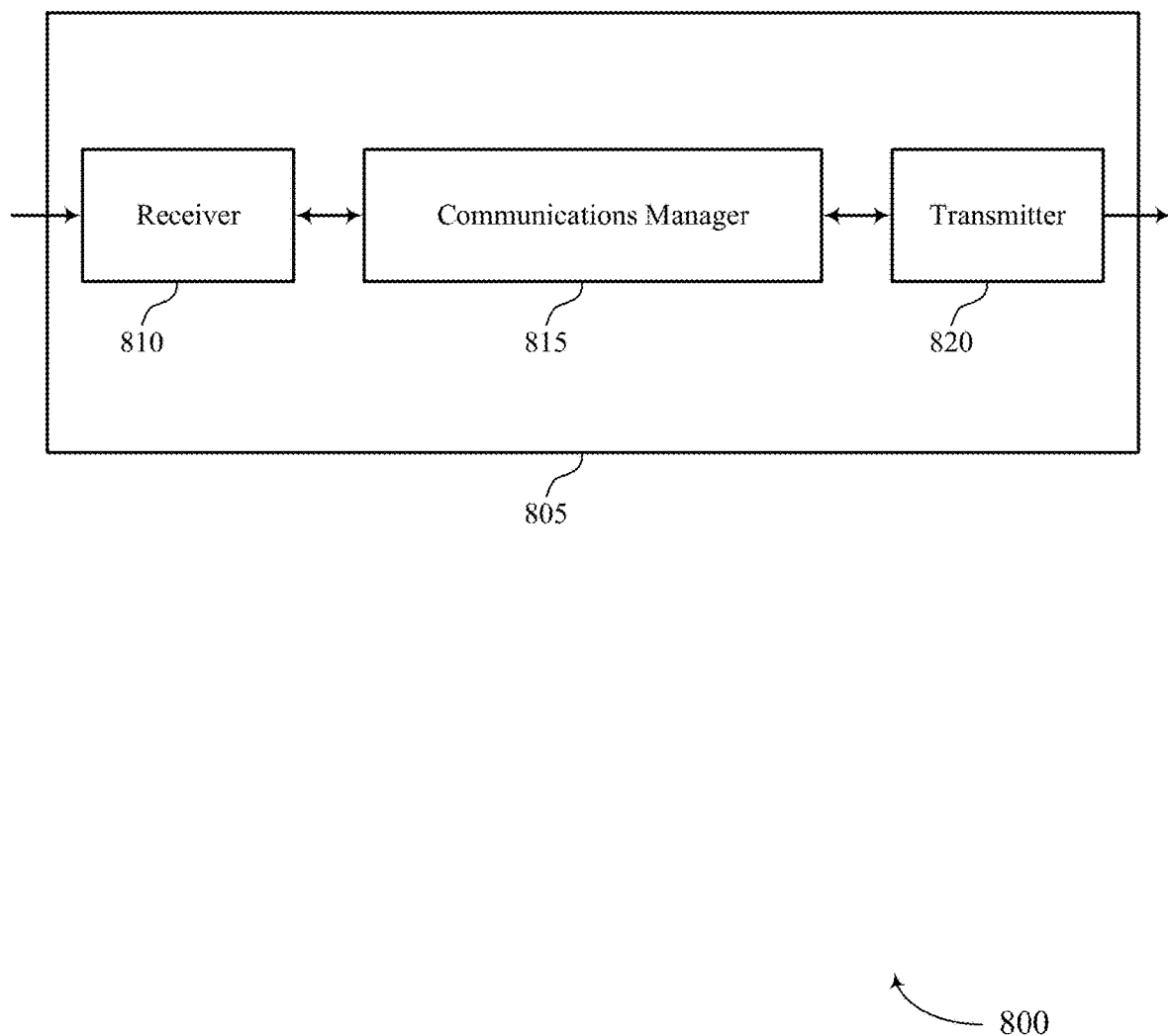
FIGS. 8 and 9 show block diagrams of devices that support methods for power savings with millimeter wave relays in accordance with aspects of the present disclosure.

FIG. 8 shows a block diagram 800 of a device 805 that supports methods for power savings with millimeter wave relays in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to beam selection in handheld wireless communications devices, etc.). Information may be passed on to other components of the device 805. The receiver 810 may be an example of aspects of the transceiver 1120 described with reference to FIG. 11. Periodically, the signals received by receiver 810 may be measured. The receiver 810 may utilize a single antenna or a set of antennas.

The communications manager 815 may identify a trigger condition associated with a first communication link between the first UE and a base station, establish a second communication link between the first UE and a second UE, transmit a relay request to the second UE via the second communication link based on the trigger condition, where the relay request includes an instruction for the second UE to relay communications between the first UE and the base station, and communicate with the base station via the second communication link based on the relay request. Alternatively, if the device 805 is acting as a relay node, the communications manager 815 may also establish a first communication link between the first UE and a second UE, receive a relay request from the second UE via the first communication link, where the relay request includes an instruction for the first UE to relay communications between the second UE and a base station, and relay communications associated with the second UE to the base station via a second communication link between the first UE and the base station based on the relay request. The communications manager 815 may be an example of aspects of the UE communications manager 140 and the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. Periodically, the signals transmitted by receiver 810 may be measured. The transmitter 820 may utilize a single antenna or a set of antennas.

In some cases, the communications manager 815 may be implemented as a chipset of a wireless modem. The receiver 810 and the transmitter 820 may include analog components (e.g., amplifiers, filters, phase shifters, antennas, etc.) coupled to the wireless modem over a receive interface and a transmit interface, respectively, to enable the reception and transmission of wireless signals.

Figure 9:
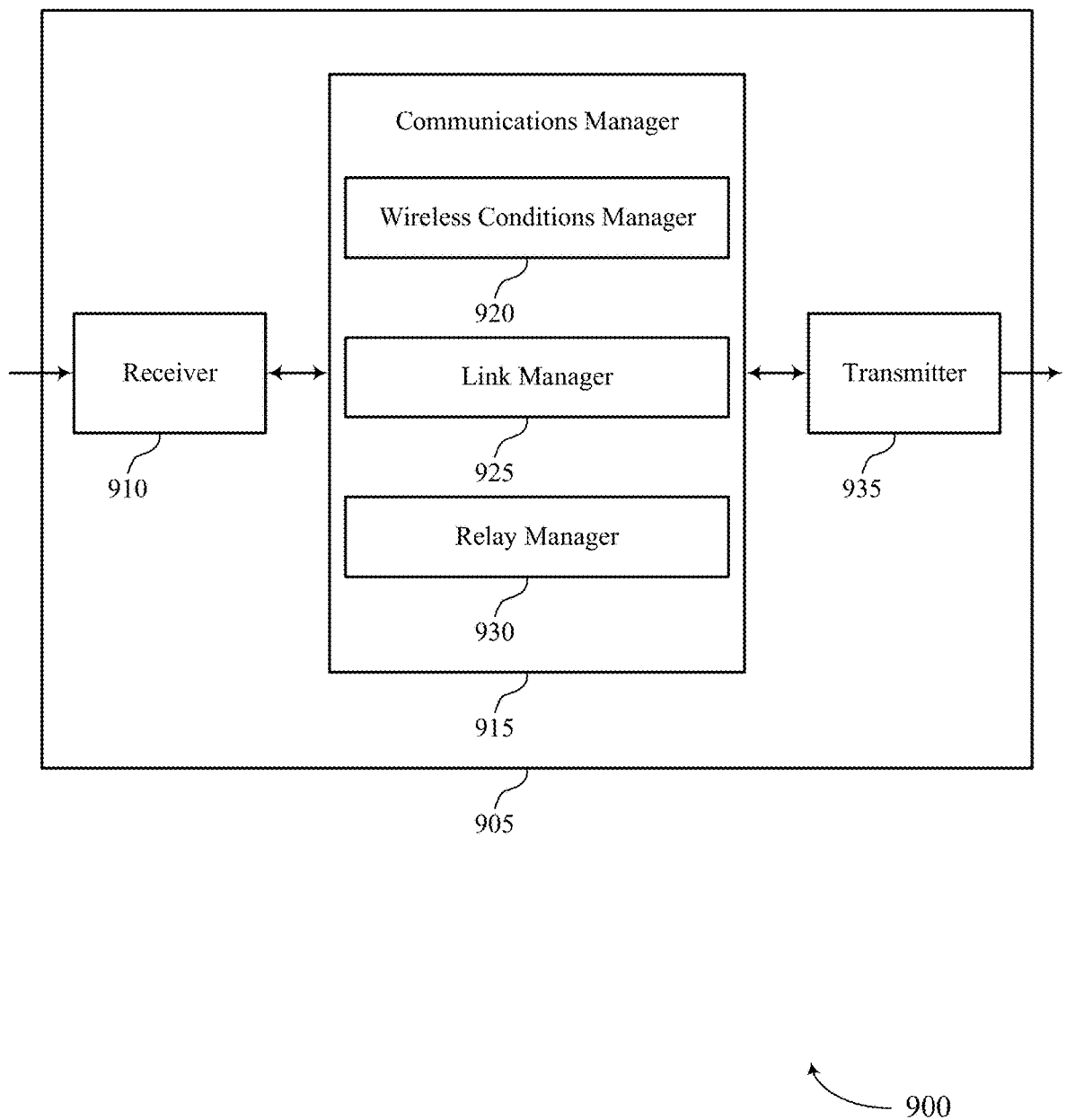

FIG. 9 shows a block diagram 900 of a device 905 that supports methods for power savings with millimeter wave relays in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to beam selection in handheld wireless communications devices, etc.). Information may be passed on to other components of the device 905. The receiver 910 may be an example of aspects of the transceiver 1120 described with reference to FIG. 11. Periodically, the signals received by receiver 910 may be measured. The receiver 910 may utilize a single antenna or a set of antennas.

The communications manager 915 may be an example of aspects of the communications manager 815 or the UE communications manager 140 as described herein. The communications manager 915 may include a wireless conditions manager 920, a link manager 925, and a relay manager 930. The communications manager 915 may be an example of aspects of the communications manager 1110 described herein.

The wireless conditions manager 920 may identify a trigger condition associated with a first communication link between the first UE and a base station. The wireless conditions manager 920 may monitor channel conditions throughout the time a relay is used.

The link manager 925 may establish one or more communication links. For example, the link manager 925 may establish a second communication link between the first UE and a second UE. The link manager 925 may establish the second communication link when it is acting as the relay node or when it requests a relay.

The relay manager 930 may transmit a relay request to the second UE via the second communication link based on the trigger condition, where the relay request includes an instruction for the second UE to relay communications between the first UE and the base station and communicate with the base station via the second communication link based on the relay request. In other examples, the relay manager 930 may receive a relay request from the second UE via the first communication link, where the relay request includes an instruction for the first UE to relay communications between the second UE and a base station and relay communications associated with the second UE to the base station via a second communication link between the first UE and the base station based on the relay request.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. Periodically, the signals transmitted by receiver 910 may be measured. The transmitter 935 may utilize a single antenna or a set of antennas.

Figure 10:
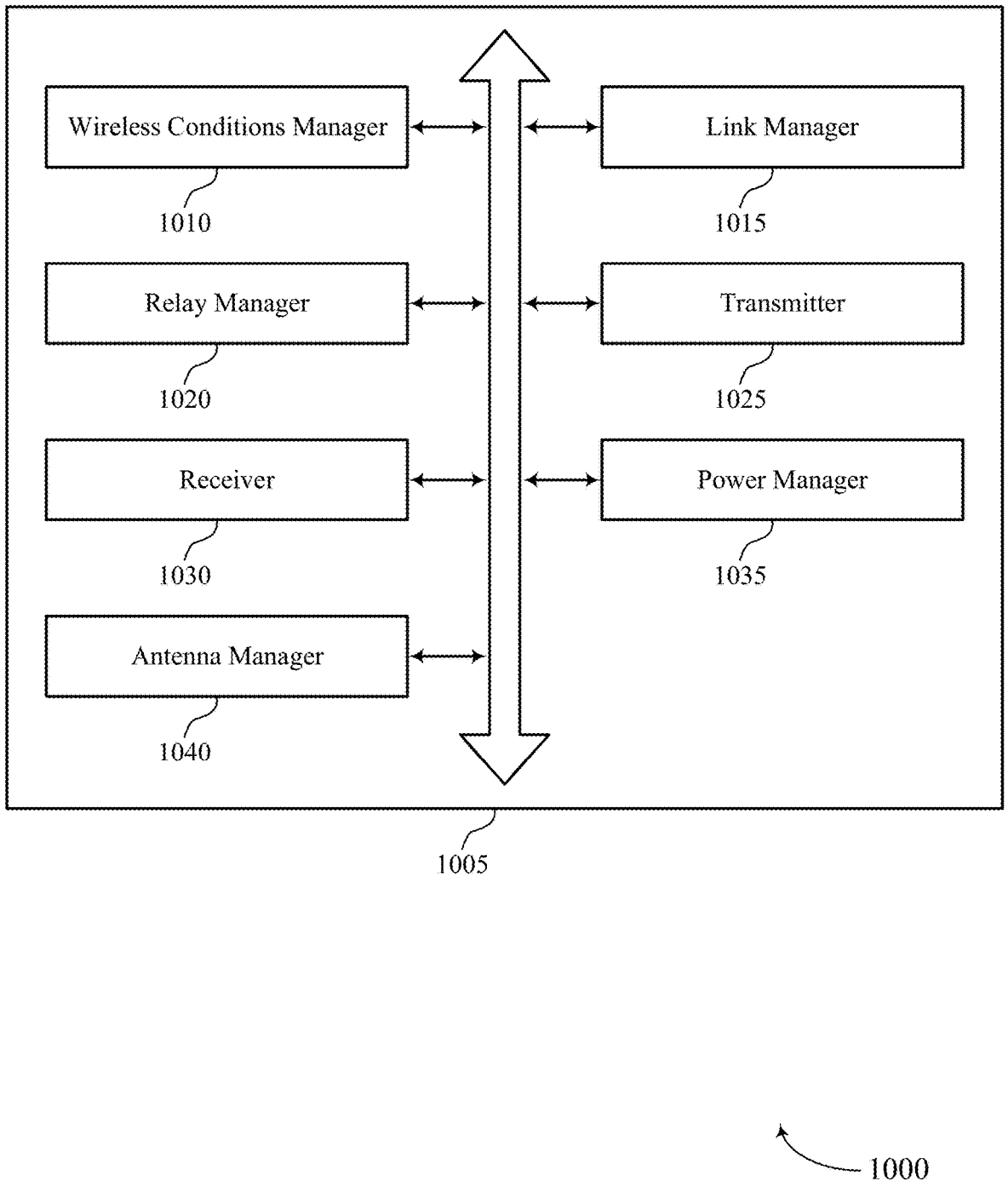
FIG. 10 shows a block diagram of a communications manager that supports methods for power savings with millimeter wave relays in accordance with aspects of the present disclosure.

FIG. 10 shows a block diagram 1000 of a communications manager 1005 that supports methods for power savings with millimeter wave relays in accordance with aspects of the present disclosure. The communications manager 1005 may be an example of aspects of a UE communications manager 140, a communications manager 815, a communications manager 915, or a communications manager 1110 described herein. The communications manager 1005 may include a wireless conditions manager 1010, a link manager 1015, a relay manager 1020, a transmitter 1025, a receiver 1030, a power manager 1035, and an antenna manager 1040. Each of these modules may communicate, directly or indirectly, with one another (e.g., via one or more buses).

The wireless conditions manager 1010 may identify a trigger condition associated with a first communication link between the first UE and a base station. In some examples, the wireless conditions manager 1010 may determine a transmit power usage for the first communication link, where the trigger condition is based on the transmit power usage. In some examples, the wireless conditions manager 1010 may determine that a third communication link between the second UE and the base station has a lower link budget than the first communication link plus the second communication link. In some examples, the wireless conditions manager 1010 may determine a first LOS status condition between the first UE and the base station. In some examples, the wireless conditions manager 1010 may determine a second LOS status condition between the second UE and the base station, where the trigger condition is based on the first LOS status condition and the second LOS status condition.

In some examples, the wireless conditions manager 1010 may continue to monitor the at least one trigger condition after establishing the second communication link. In some examples, the wireless conditions manager 1010 may determine, based at least on the continued monitoring, that the trigger condition is currently invalid. In some examples, the wireless conditions manager 1010 may monitor for at least one terminating condition after establishing the second communication link. In some examples, the wireless conditions manager 1010 may determine, based at least on the monitoring, that the at least one terminating condition has occurred.

The link manager 1015 may establish a second communication link between the first UE and a second UE. In some examples, the link manager 1015 may establish a first communication link between the first UE and a second UE. In some examples, the link manager 1015 may switch back to the first communication link based on the trigger condition being currently invalid.

The relay manager 1020 may transmit a relay request to the second UE via the second communication link based on the trigger condition, where the relay request includes an instruction for the second UE to relay communications between the first UE and the base station. In some examples, the relay manager 1020 may communicate with the base station via the second communication link based on the relay request. In some examples, receiving a relay request from the second UE via the first communication link, where the relay request includes an instruction for the first UE to relay communications between the second UE and a base station.

In some examples, the relay manager 1020 may relay communications associated with the second UE to the base station via a second communication link between the first UE and the base station based on the relay request. In some examples, the relay manager 1020 may select the second UE from a list of available UEs.

In some examples, the relay manager 1020 may select the second UE from the list of available UEs is based on at least one of a location of the second UE, a proximity of the second UE, an antenna module used by the first UE for the second communication link, a radio frequency integrated circuit used by the first UE for the second communication link, a direction of a relay link associated with the second communication link, a data size of a payload to communicate via the second UE, a priority associated with the payload, a link budget associated with the second UE, or a combination thereof.

The transmitter 1025 may transmit a data forwarding request to the base station via the first communication link or the second communication link, where the data forwarding request includes an instruction for the base station to use the second UE to relay communications between the base station and the first UE.

In some examples, the transmitter 1025 may transmit an identifier of the second UE to the base station via the first communication link or the second communication link. In some examples, the transmitter 1025 may transmit an acceptance message regarding the relay request to the second UE via the first communication link. In some examples, transmitting a data forwarding request to the base station via the first communication link or the second communication link, where the data forwarding request includes an instruction for the base station to use the first UE to relay communications between the base station and the second UE.

In some examples, the transmitter 1025 may transmit a signal report to the second UE, where the relay request is based on the signal report. In some examples, the transmitter 1025 may send a relay cancelation message to the second UE over the first communication link based on the occurrence of the terminating condition.

The receiver 1030 may receive a signal report from the second UE, where the trigger condition is further based on the signal report.

The power manager 1035 may determine that a power level of the first UE is less than a threshold level. In some examples, the power manager 1035 may determine that a power level of the first UE is greater than a threshold level, where relaying communications associated with the second UE with the base station via the second communication link is based on the power level of the first UE being greater than the threshold level.

The antenna manager 1040 may determine that the first UE uses a first antenna module for the first communication link and uses a second antenna module different from the first antenna module for the second communication link, where a transmit power used by the first antenna module is larger than a transmit power used by the second antenna module. In some cases, the first UE uses less antenna modules for the second communication link than for the first communication link.

Figure 11:
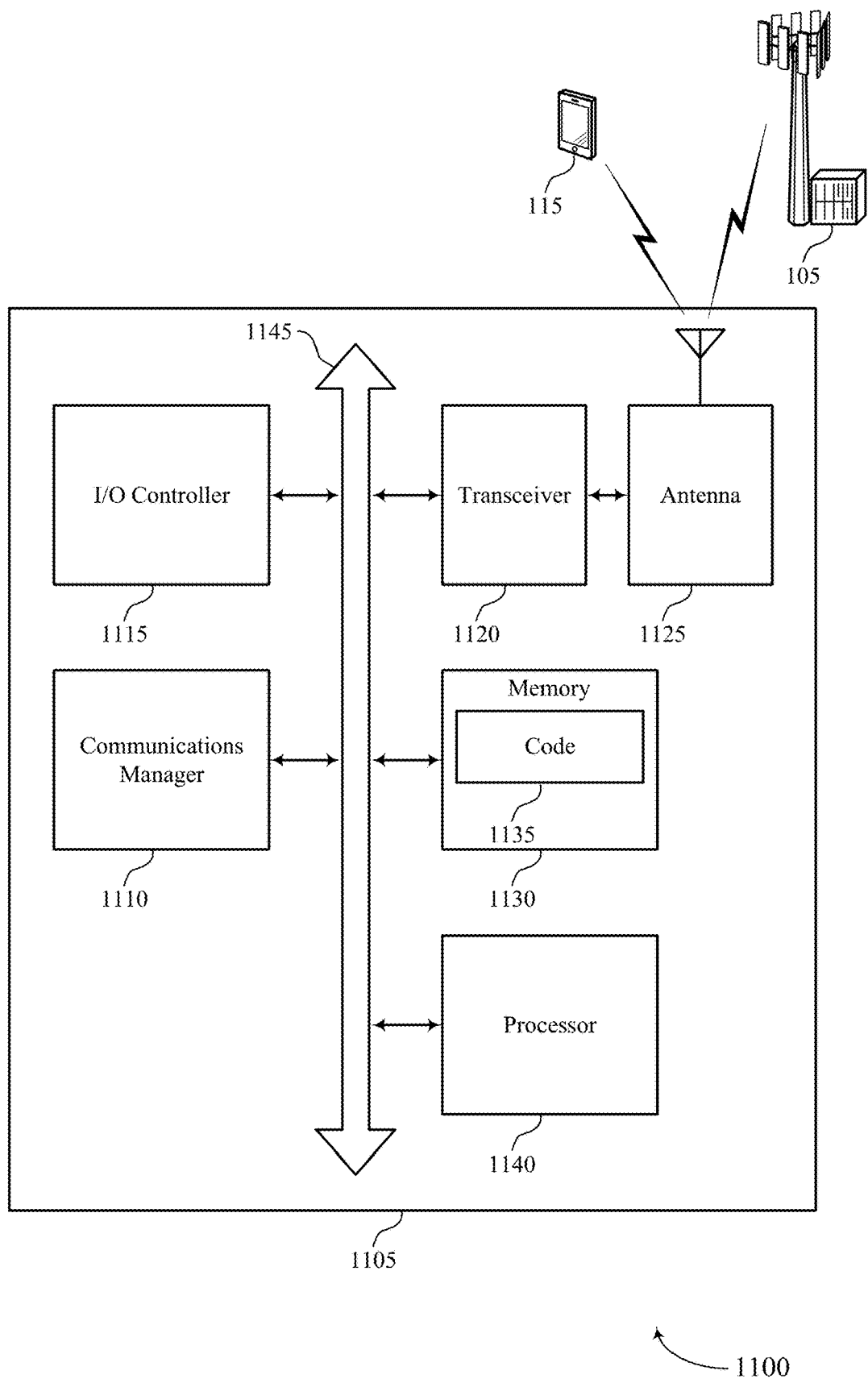
FIG. 11 shows a diagram of a system including a device that supports methods for power savings with millimeter wave relays in accordance with aspects of the present disclosure.

FIG. 11 shows a diagram of a system 1100 including a device 1105 that supports methods for power savings with millimeter wave relays in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may identify a trigger condition associated with a first communication link between the first UE and a base station, establish a second communication link between the first UE and a second UE, transmit a relay request to the second UE via the second communication link based on the trigger condition, where the relay request includes an instruction for the second UE to relay communications between the first UE and the base station, and communicate with the base station via the second communication link based on the relay request. The communications manager 1110 may also establish a first communication link between the first UE and a second UE, receive a relay request from the second UE via the first communication link, where the relay request includes an instruction for the first UE to relay communications between the second UE and a base station, and relay communications associated with the second UE to the base station via a second communication link between the first UE and the base station based on the relay request.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the device 1105 may include a single antenna 1125. However, in some cases the device 1105 may have more than one antenna 1125, which may be capable of concurrently transmitting or receiving multiple wireless transmissions. Each antenna 1125 may comprise one or more phasors.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting beam selection in handheld wireless communications devices).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
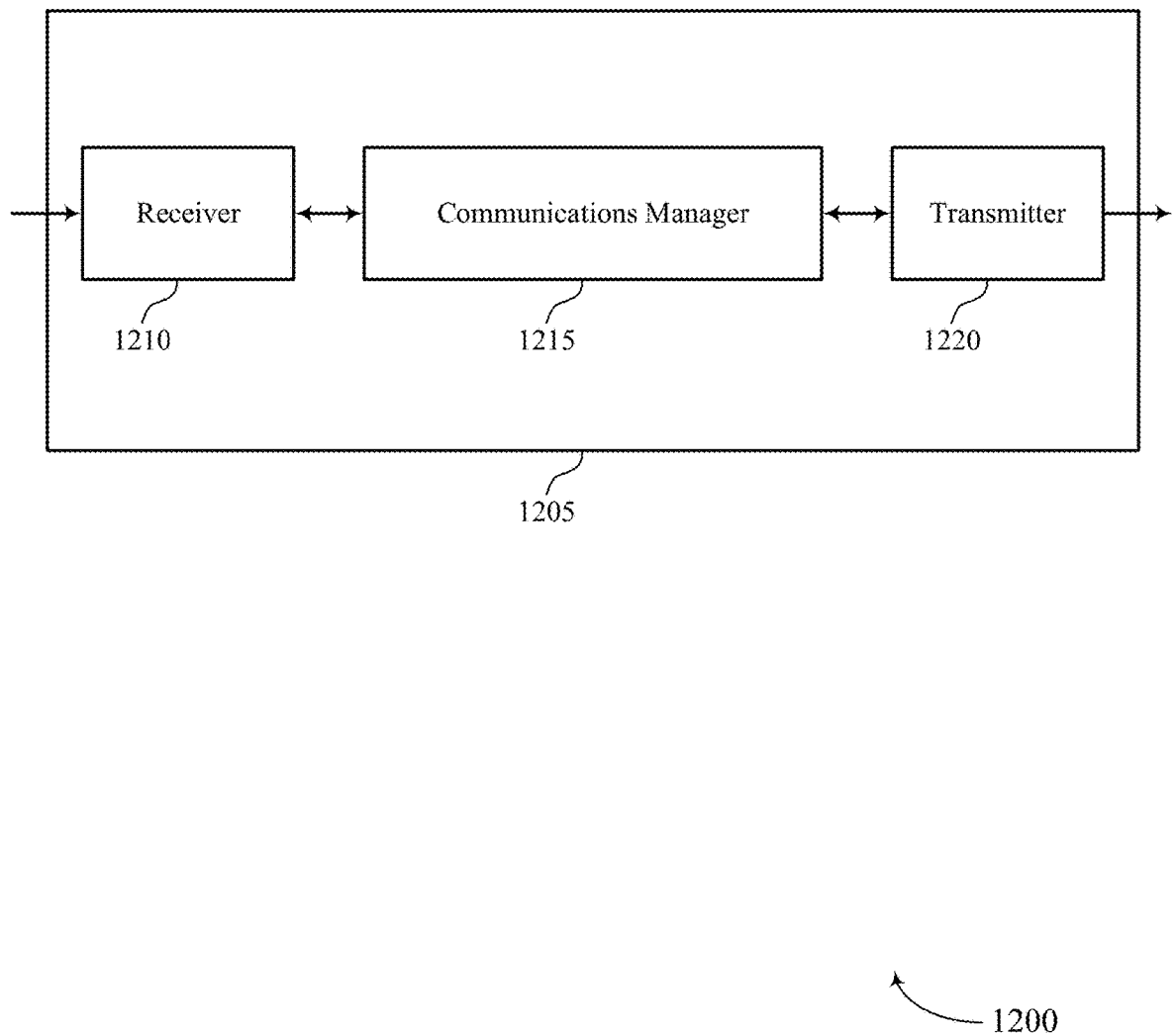
FIGS. 12 and 13 show block diagrams of devices that support methods for power savings with millimeter wave relays in accordance with aspects of the present disclosure.

FIG. 12 shows a block diagram 1200 of a device 1205 that supports methods for power savings with millimeter wave relays in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to methods for power savings with millimeter wave relays, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may establish a first communication link between a first UE and the base station, establish a second communication link between a second UE and the base station, receive a data forwarding request, where the data forwarding request includes an instruction for the base station to use the second UE to relay communications between the base station and the first UE, and communicate with the first UE via the second communication link based on the relay request. The communications manager 1215 may be an example of aspects of the base station communications manager 150 and the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

In some cases, the communications manager 1215 may be implemented as a chipset of a wireless modem. The receiver 1210 and the transmitter 1220 may include analog components (e.g., amplifiers, filters, phase shifters, antennas, etc.) coupled to the wireless modem over a receive interface and a transmit interface, respectively, to enable the reception and transmission of wireless signals.

Figure 13:
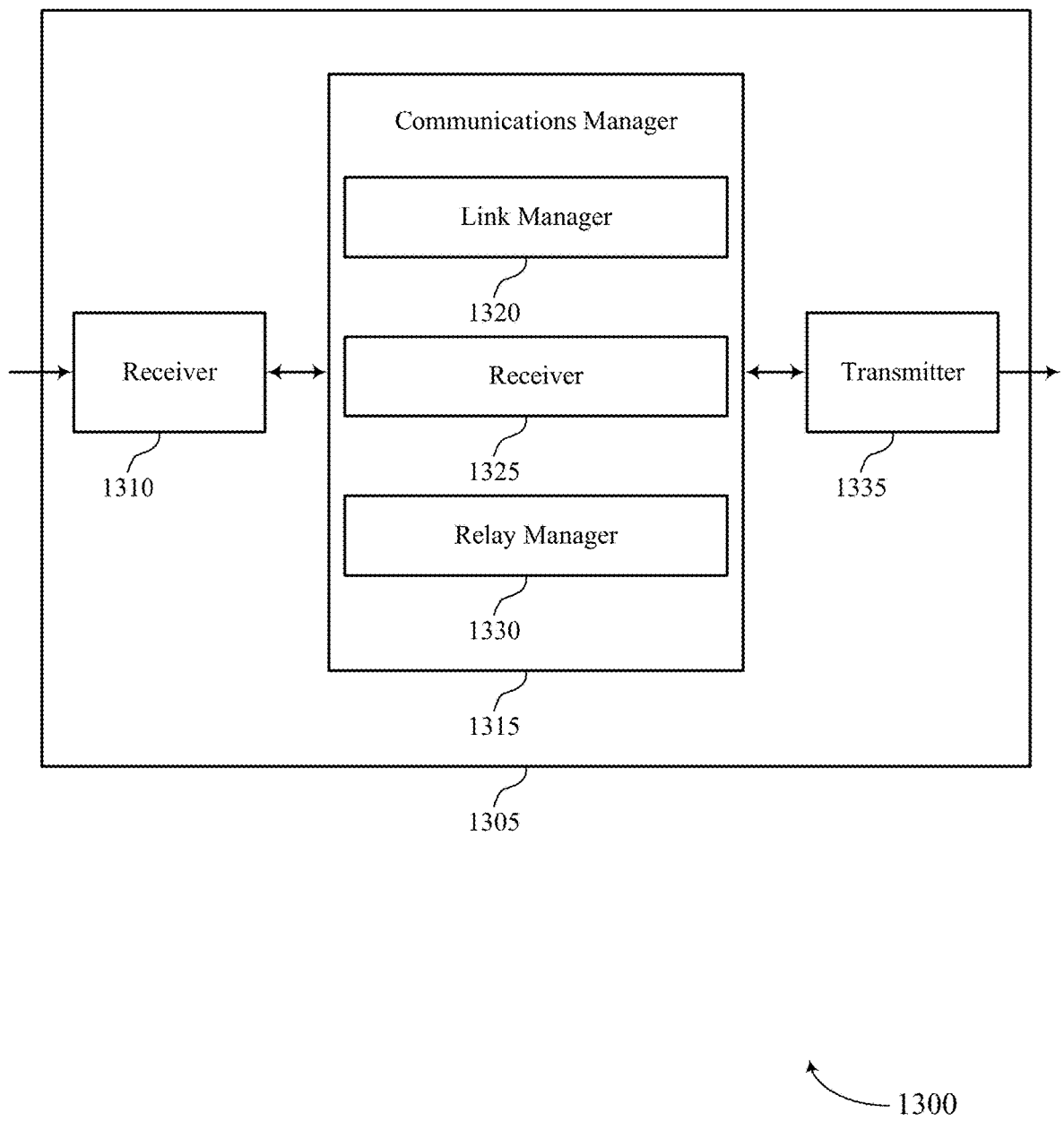

FIG. 13 shows a block diagram 1300 of a device 1305 that supports methods for power savings with millimeter wave relays in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to methods for power savings with millimeter wave relays, etc.). Information may be passed on to other components of the device 1305. The receiver 1310 may be an example of aspects of the transceiver 1520 described with reference to FIG. 15. The receiver 1310 may utilize a single antenna or a set of antennas. The receiver 1325 may receive a data forwarding request, where the data forwarding request includes an instruction for the base station to use the second UE to relay communications between the base station and the first UE.

The communications manager 1315 may be an example of aspects of the communications manager 1215 as described herein. The communications manager 1315 may include a link manager 1320, a receiver 1325, and a relay manager 1330. The communications manager 1315 may be an example of aspects of the communications manager 1510 described herein.

The link manager 1320 may establish a first communication link between a first UE and the base station and establish a second communication link between a second UE and the base station.

The relay manager 1330 may communicate with the first UE via the second communication link based on the relay request.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
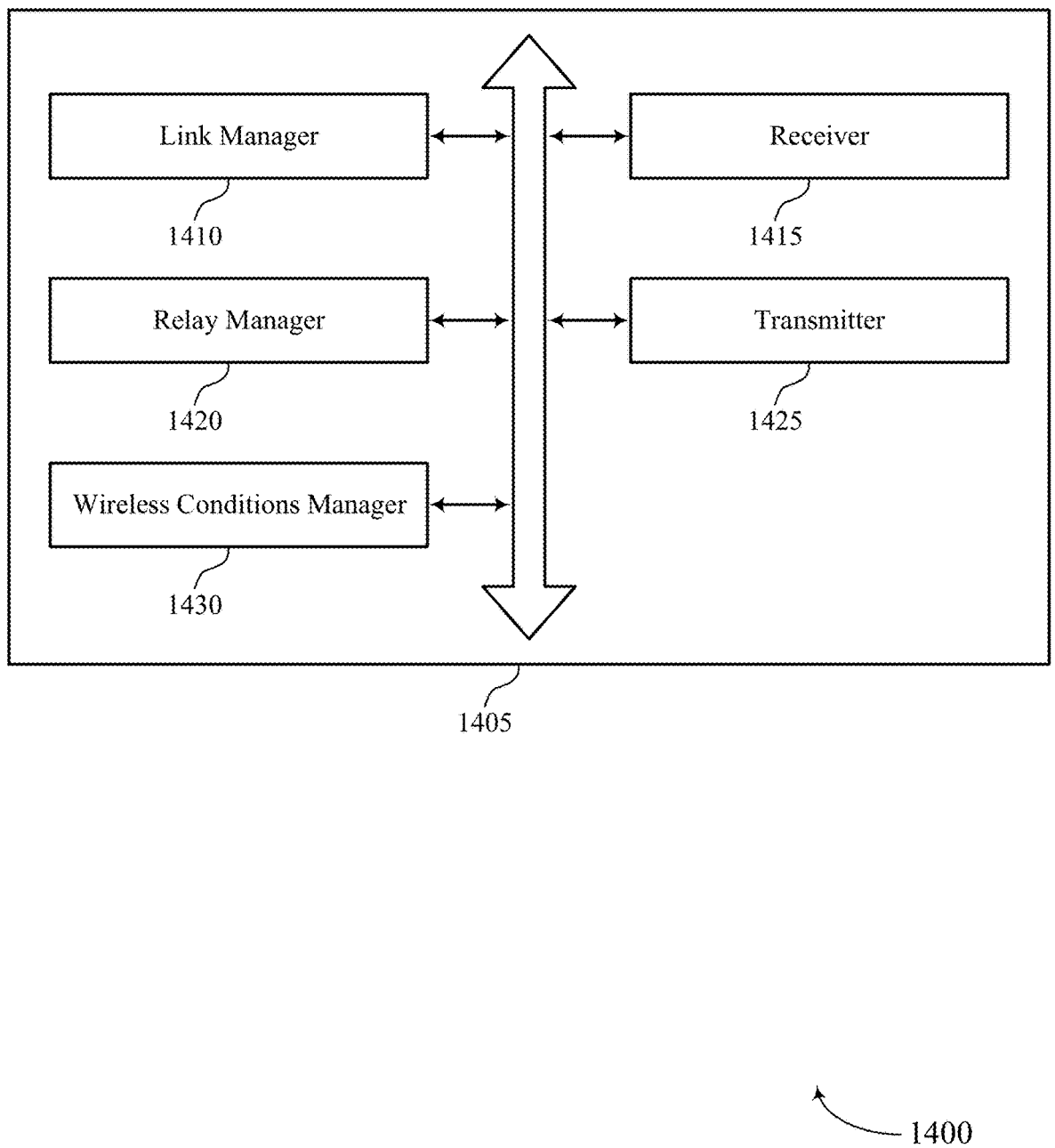
FIG. 14 shows a block diagram of a communications manager that supports methods for power savings with millimeter wave relays in accordance with aspects of the present disclosure.

FIG. 14 shows a block diagram 1400 of a communications manager 1405 that supports methods for power savings with millimeter wave relays in accordance with aspects of the present disclosure. The communications manager 1405 may be an example of aspects of a base station communications manager 150, a communications manager 1215, a communications manager 1315, or a communications manager 1510 described herein. The communications manager 1405 may include a link manager 1410, a receiver 1415, a relay manager 1420, a transmitter 1425, and a wireless conditions manager 1430. Each of these modules may communicate, directly or indirectly, with one another (e.g., via one or more buses).

The link manager 1410 may establish a first communication link between a first UE and the base station. In some examples, the link manager 1410 may establish a second communication link between a second UE and the base station. In some cases, the communications between the first UE and the base station via the second communication link are security- or privacy-encoded.

The receiver 1415 may receive a data forwarding request, where the data forwarding request includes an instruction for the base station to use the second UE to relay communications between the base station and the first UE. In some examples, the receiver 1415 may receive an identifier of the second UE via the first communication link, where establishing the second communication link is based on receiving the identifier.

The relay manager 1420 may communicate with the first UE via the second communication link based on the relay request.

The transmitter 1425 may transmit a signal report to the first UE via the first communication link, where the data forwarding request is further based on the signal report. In some examples, the transmitter 1425 may communicate information regarding the first link budget and the second link budget via one of the first communication link or the second communication link. In some examples, the transmitter 1425 may transmit a relay cancelation message to the second UE over the second communication link based on the occurrence of the terminating condition. In some cases, the signal report indicates one of an RSSI, an RSRP, or an RSRQ for the communication link between the second UE and the base station.

The wireless conditions manager 1430 may determine a first link budget of the first communication link between the first UE and the base station. In some examples, the wireless conditions manager 1430 may determine a second link budget of the second communication link between the second UE and the base station. In some examples, the wireless conditions manager 1430 may monitor for at least one terminating condition regarding the second communication link. In some examples, the wireless conditions manager 1430 may determine, based at least on the monitoring, that the at least one terminating condition has occurred.

Figure 15:
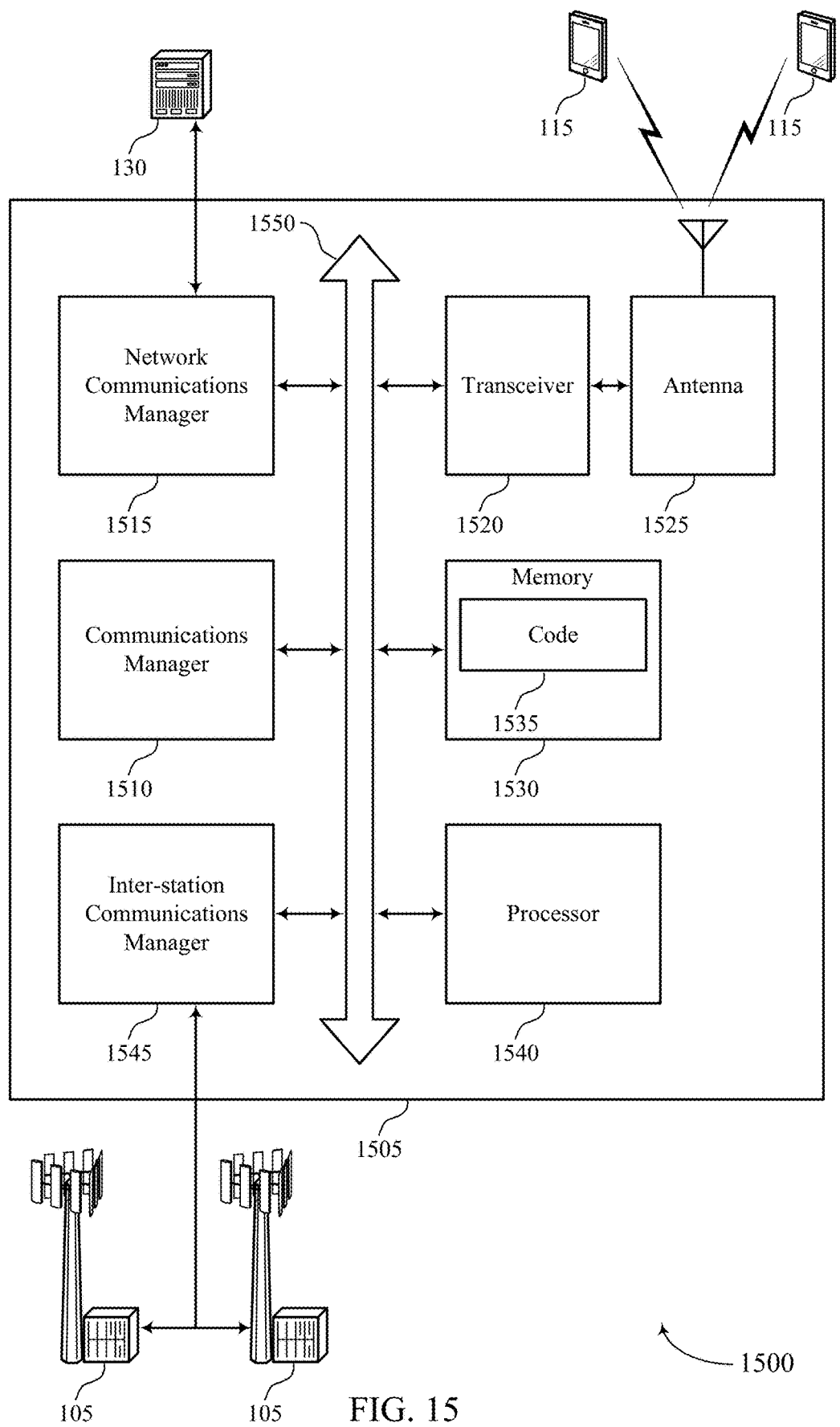
FIG. 15 shows a diagram of a system including a device that supports methods for power savings with millimeter wave relays in accordance with aspects of the present disclosure.

FIG. 15 shows a diagram of a system 1500 including a device 1505 that supports methods for power savings with millimeter wave relays in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may establish a first communication link between a first UE and the base station, establish a second communication link between a second UE and the base station, receive a data forwarding request, where the data forwarding request includes an instruction for the base station to use the second UE to relay communications between the base station and the first UE, and communicate with the first UE via the second communication link based on the relay request.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting methods for power savings with millimeter wave relays).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
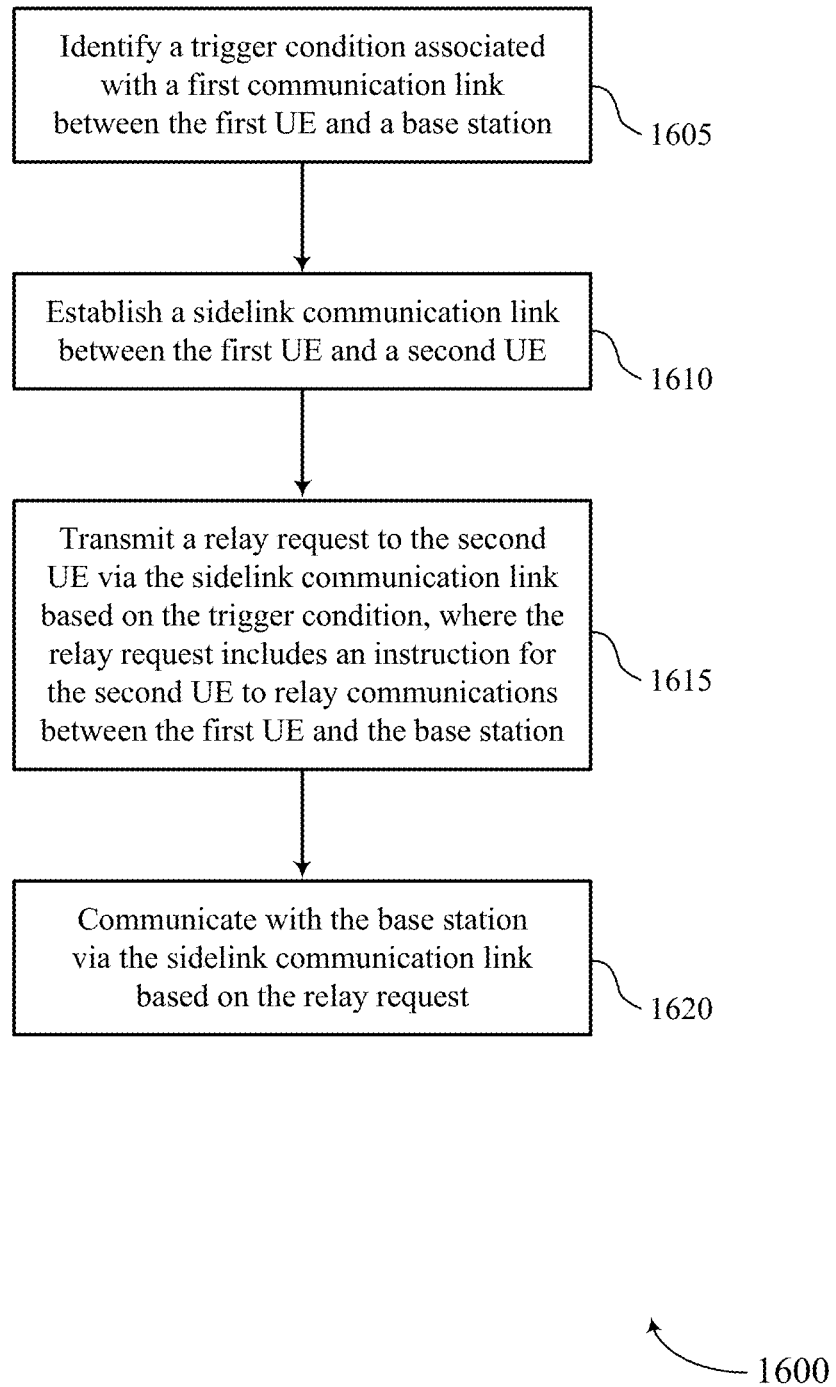
FIGS. 16 through 18 show flowcharts illustrating methods that support methods for power savings with millimeter wave relays in accordance with aspects of the present disclosure.

FIG. 16 shows a flowchart illustrating a method 1600 that supports methods for power savings with millimeter wave relays in accordance with aspects of the present disclosure. The operations of method 1600 may be implemented by a UE 115 or its components as described herein. For example, the operations of method 1600 may be performed by a communications manager as described with reference to FIGS. 1 and 8 through 11. In some examples, a UE may execute a set of instructions to control the functional elements of the UE to perform the functions described below. Additionally or alternatively, a UE may perform aspects of the functions described below using special-purpose hardware.

At 1605, the UE may identify a trigger condition associated with a first communication link between the first UE and a base station. The operations of 1605 may be performed according to the methods described herein. In some examples, aspects of the operations of 1605 may be performed by a wireless conditions manager as described with reference to FIGS. 8 through 11.

At 1610, the UE may establish a second communication link between the first UE and a second UE. The operations of 1610 may be performed according to the methods described herein. In some examples, aspects of the operations of 1610 may be performed by a link manager as described with reference to FIGS. 8 through 11.

At 1615, the UE may transmit a relay request to the second UE via the second communication link based on the trigger condition, where the relay request includes an instruction for the second UE to relay communications between the first UE and the base station. The operations of 1615 may be performed according to the methods described herein. In some examples, aspects of the operations of 1615 may be performed by a relay manager as described with reference to FIGS. 8 through 11.

At 1620, the UE may communicate with the base station via the second communication link based on the relay request. The operations of 1620 may be performed according to the methods described herein. In some examples, aspects of the operations of 1620 may be performed by a relay manager as described with reference to FIGS. 8 through 11.

Additionally or alternatively, means for performing 1605, 1610, 1615, and 1620 may, but not necessarily, include, for example, antenna 1125, transceiver 1120, communications manager 1110, memory 1130 (including code 1135), processor 1140, and/or bus 1145.

Figure 17:
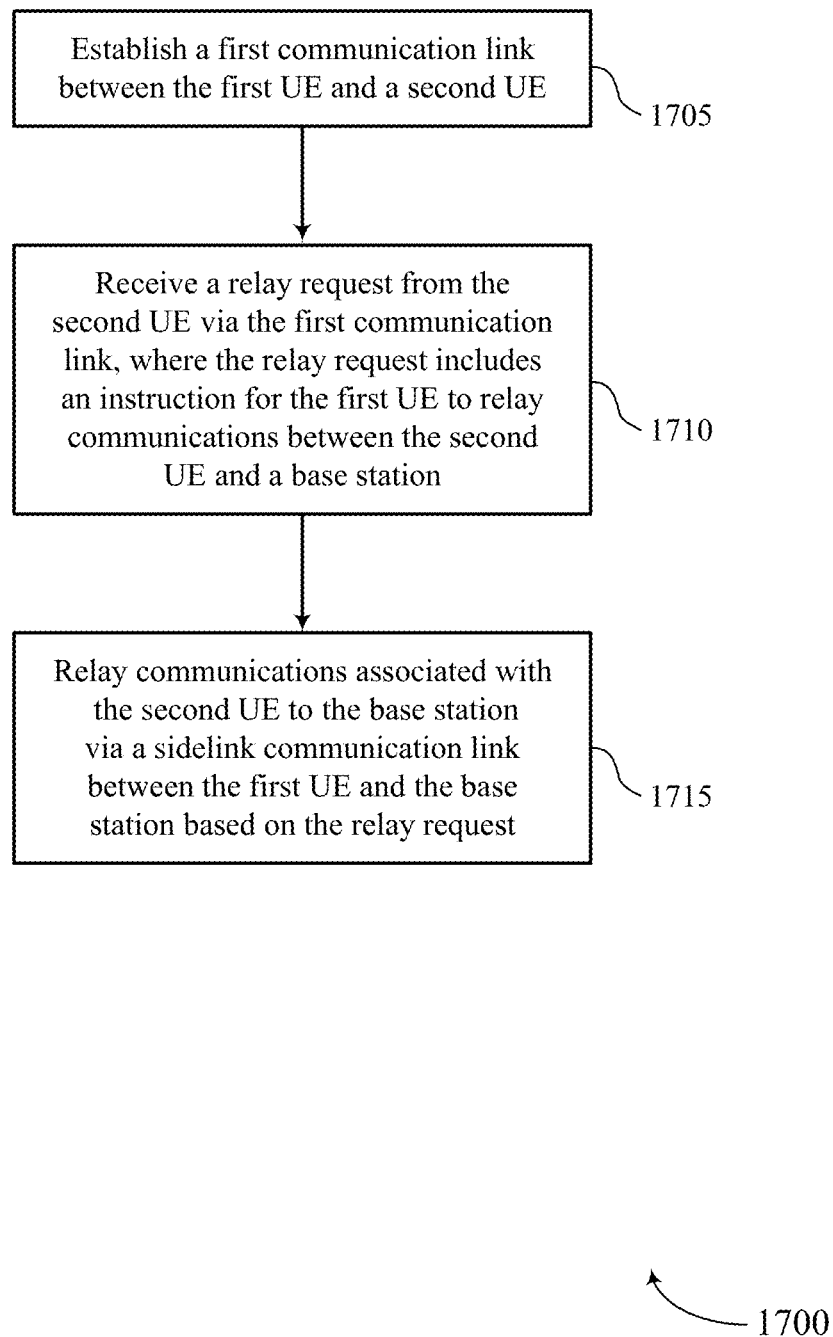

FIG. 17 shows a flowchart illustrating a method 1700 that supports methods for power savings with millimeter wave relays in accordance with aspects of the present disclosure. The operations of method 1700 may be implemented by a UE 115 or its components as described herein. For example, the operations of method 1700 may be performed by a communications manager as described with reference to FIGS. 1 and 8 through 11. In some examples, a UE may execute a set of instructions to control the functional elements of the UE to perform the functions described below. Additionally or alternatively, a UE may perform aspects of the functions described below using special-purpose hardware.

At 1705, the UE may establish a first communication link between the first UE and a second UE. The operations of 1705 may be performed according to the methods described herein. In some examples, aspects of the operations of 1705 may be performed by a link manager as described with reference to FIGS. 8 through 11.

At 1710, the UE may receive a relay request from the second UE via the first communication link, where the relay request includes an instruction for the first UE to relay communications between the second UE and a base station. The operations of 1710 may be performed according to the methods described herein. In some examples, aspects of the operations of 1710 may be performed by a relay manager as described with reference to FIGS. 8 through 11.

At 1715, the UE may relay communications associated with the second UE to the base station via a second communication link between the first UE and the base station based on the relay request. The operations of 1715 may be performed according to the methods described herein. In some examples, aspects of the operations of 1715 may be performed by a relay manager as described with reference to FIGS. 8 through 11.

Additionally or alternatively, means for performing 1705, 1710, and 1715 may, but not necessarily, include, for example, antenna 1125, transceiver 1120, communications manager 1110, memory 1130 (including code 1135), processor 1140, and/or bus 1145.

Figure 18:
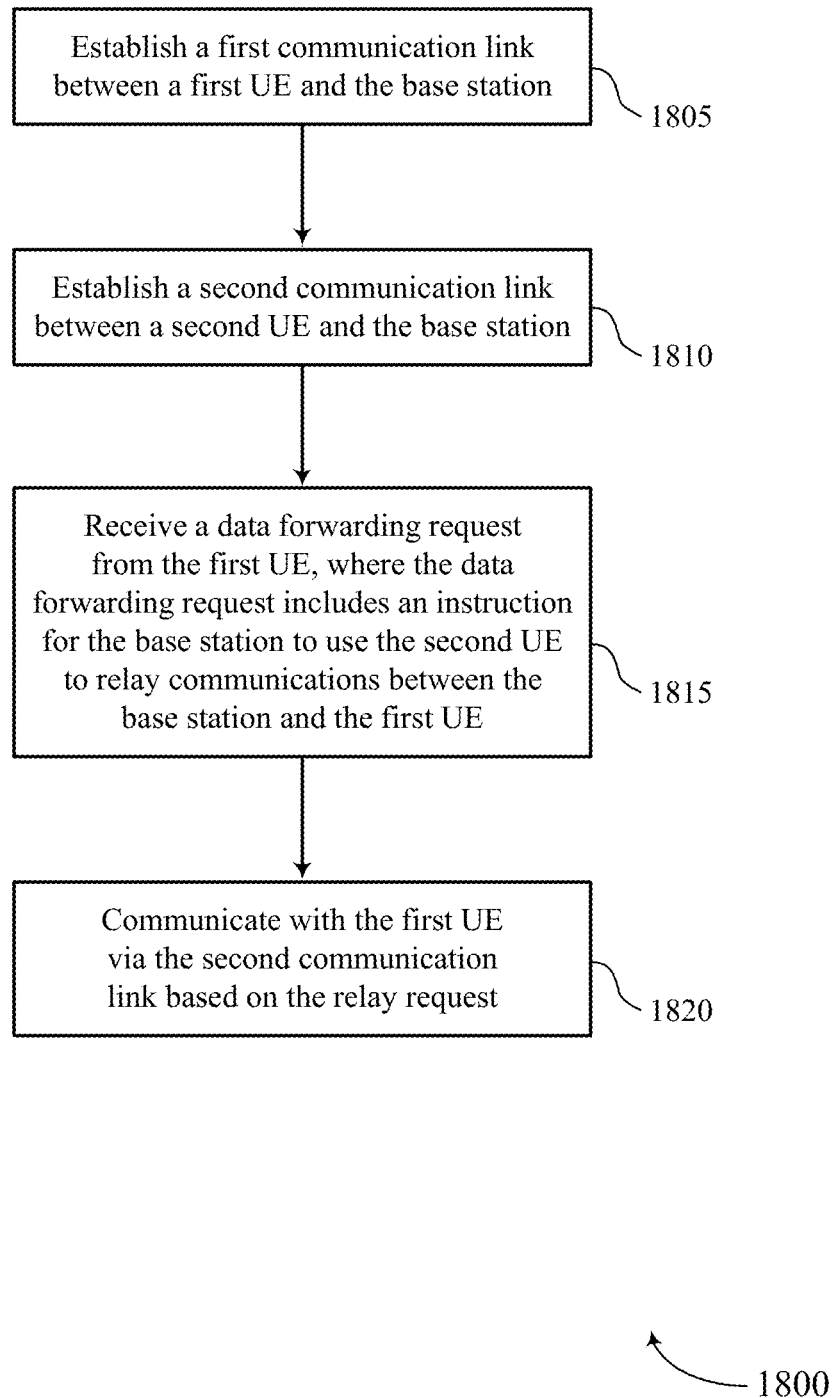

FIG. 18 shows a flowchart illustrating a method 1800 that supports methods for power savings with millimeter wave relays in accordance with aspects of the present disclosure. The operations of method 1800 may be implemented by a base station 105 or its components as described herein. For example, the operations of method 1800 may be performed by a communications manager as described with reference to FIGS. 1 and 12 through 15. In some examples, a base station may execute a set of instructions to control the functional elements of the base station to perform the functions described below. Additionally or alternatively, a base station may perform aspects of the functions described below using special-purpose hardware.

At 1805, the base station may establish a first communication link between a first UE and the base station. The operations of 1805 may be performed according to the methods described herein. In some examples, aspects of the operations of 1805 may be performed by a link manager as described with reference to FIGS. 12 through 15.

At 1810, the base station may establish a second communication link between a second UE and the base station. The operations of 1810 may be performed according to the methods described herein. In some examples, aspects of the operations of 1810 may be performed by a link manager as described with reference to FIGS. 12 through 15.

At 1815, the base station may receive a data forwarding request, where the data forwarding request includes an instruction for the base station to use the second UE to relay communications between the base station and the first UE. The operations of 1815 may be performed according to the methods described herein. In some examples, aspects of the operations of 1815 may be performed by a receiver as described with reference to FIGS. 12 through 15.

At 1820, the base station may communicate with the first UE via the second communication link based on the relay request. The operations of 1820 may be performed according to the methods described herein. In some examples, aspects of the operations of 1820 may be performed by a relay manager as described with reference to FIGS. 12 through 15.

Additionally or alternatively, means for performing 1805, 1810, 1815, and 1820 may, but not necessarily, include, for example, antenna 1525, transceiver 1520, communications manager 1510, memory 1530 (including code 1535), processor 1540, network communications manager 1515, and/or bus 1555.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project"

(3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first user equipment (UE), comprising:
monitoring one or more parameters associated with a trigger condition, wherein the trigger condition is associated with a first communication link between the first UE and a network device;
receiving a signal report from a second UE, wherein the signal report indicates one or more parameters associated with a third communication link between the second UE and the network device, and wherein the one or more parameters associated with the third communication link comprise a received signal strength indicator, a reference signal received power, a reference signal received quality, or any combination thereof;
detecting an occurrence of the trigger condition based at least in part on the monitoring and the signal report;
establishing a sidelink communication link, the sidelink communication comprising a second communication link between the first UE and the second UE;
transmitting a relay request to the second UE via the sidelink communication link based at least in part on the trigger condition, wherein the relay request comprises a request for the second UE to relay communications between the first UE and the network device; and
communicating with the network device via the sidelink communication link based at least in part on the relay request.

2. The method of claim 1, wherein establishing the sidelink communication link comprises:
transmitting a data forwarding request to the network device via the first communication link or the sidelink communication link, wherein the data forwarding request comprises an instruction for the network device to use the second UE to relay communications between the network device and the first UE.

3. The method of claim 1, further comprising:
determining a transmit power usage for the first communication link, wherein the trigger condition is based at least in part on the transmit power usage.

4. The method of claim 1, wherein identifying the trigger condition further comprises:
determining that the third communication link between the second UE and the network device has a lower link budget than the first communication link plus the sidelink communication link.

5. The method of claim 1, further comprising:
determining a first line-of-sight status condition between the first UE and the network device; and
determining a second line-of-sight status condition between the second UE and the network device, wherein the trigger condition is based on the first line-of-sight status condition and the second line-of-sight status condition.

6. The method of claim 1, wherein identifying the trigger condition further comprises:
determining that a power level of the first UE is less than a threshold level.

7. The method of claim 1, wherein identifying the trigger condition further comprises:
determining that the first UE uses a first antenna module for the first communication link and uses a second antenna module different from the first antenna module for the sidelink communication link, wherein the trigger condition is based at least in part on a transmit power used by the first antenna module being larger than a transmit power used by the second antenna module.

8. The method of claim 1, wherein the first UE uses less antenna modules for the sidelink communication link than for the first communication link.

9. The method of claim 1, wherein the first communication link and the sidelink communication link uses a 6 gigahertz (GHz) frequency band and wherein the network device is a gNodeB.

10. The method of claim 1, wherein the communications between the first UE and the network device via the sidelink communication link are security- or privacy-encoded.

11. The method of claim 1, further comprising:
continuing to monitor the one or more parameters associated with the trigger condition after establishing the sidelink communication link;
determining, based at least on the continued monitoring, that the trigger condition is currently invalid; and
switching back to the first communication link based at least in part on the trigger condition being currently invalid.

12. The method of claim 1, wherein establishing the sidelink communication link includes:
selecting the second UE from a list of available UEs; and
transmitting, by the first UE, an identifier of the second UE to the network device via the first communication link or the sidelink communication link.

13. The method of claim 12, wherein:
selecting the second UE from the list of available UEs is based at least in part on at least one of a location of the second UE, a proximity of the second UE, an antenna module used by the first UE for the sidelink communication link, a radio frequency integrated circuit used by the first UE for the sidelink communication link, a direction of a relay link associated with the sidelink communication link, a data size of a payload to communicate via the second UE, a priority associated with the payload, a link budget associated with the second UE, or a combination thereof.

14. The method of claim 1, wherein communicating with the network device via the sidelink communication link further comprises:
transmitting, by the first UE, an identifier of the second UE to the network device via the sidelink communication link.

15. A method for wireless communication by a first user equipment (UE), comprising:
establishing a first communication link between the first UE and a second UE;

transmitting a signal report to the second UE via the first communication link, wherein the signal report indicates one or more parameters associated with a third communication link between the first UE and the network device, and wherein the one or more parameters associated with the third communication link comprise a received signal strength indicator, a reference signal received power, a reference signal received quality, or any combination thereof;
receiving a relay request from the second UE via the first communication link, wherein the relay request is based at least in part on the signal report and comprises a request for the first UE to relay communications between the second UE and the network device;
transmitting an acceptance message in response to the relay request, wherein the acceptance message comprises an indication that the first UE has granted the request for the first UE to relay communications between the second UE and the network device;
relaying communications associated with the second UE to the network device via a second communication link between the first UE and the network device based at least in part on the relay request; and
transmitting a relay cancelation message to the second UE over the first communication link based at least in part on one or more parameters at the first UE, wherein the one or more parameters at the first UE comprise a battery level of the first UE, a location of the first UE, data traffic at the first UE, an incentivization of the first UE to relay communications, one or more channel conditions at the first UE, or any combination thereof.

16. The method of claim 15, further comprising:
transmitting a data forwarding request to the network device, wherein the data forwarding request comprises an instruction for the network device to use the first UE to relay communications between the network device and the second UE.

17. The method of claim 15, further comprising:
determining that a power level of the first UE is greater than a threshold level, wherein relaying communications associated with the second UE with the network device via the second communication link is based at least in part on the power level of the first UE being greater than the threshold level.

18. A method for wireless communication at a network device, comprising:
establishing a first communication link between a first user equipment (UE) and the network device;
establishing a second communication link between a second UE and the network device;
receiving a data forwarding request from the first UE, wherein the data forwarding request comprises a request for the network device to use the second UE to relay communications between the network device and the first UE;
transmitting an acceptance message in response to the relay request, wherein the acceptance message comprises an indication that the network device has granted the request to use the second UE to relay communications between the network device and the first UE;
communicating with the first UE via the second communication link based at least in part on the relay request;
determining a first link budget of the first communication link between the first UE and the network device;
determining a second link budget of the second communication link between the second UE and the network device; and
communicating information regarding the first link budget and the second link budget via one of the first communication link or the second communication link; and
transmitting a relay cancelation message based at least in part on one or more parameters at the second UE, wherein the one or more parameters at the second UE comprise a battery level of the second UE, a location of the second UE, data traffic at the second UE, an incentivization of the second UE to relay communications, one or more channel conditions at the second UE, or any combination thereof.

19. The method of claim 18, further comprising:
transmitting a signal report to the first UE via the first communication link, wherein the data forwarding request is further based at least in part on the signal report.

20. The method of claim 18, further comprising:
monitoring for at least one terminating condition regarding the second communication link;
determining, based at least on the monitoring, that the at least one terminating condition has occurred; and
transmitting a relay cancelation message to the second UE over the second communication link based at least in part on the occurrence of the terminating condition.

21. The method of claim 18, wherein establishing the second communication link includes:
receiving an identifier of the second UE via the first communication link, wherein establishing the second communication link is based at least in part on receiving the identifier.

22. The method of claim 18, further comprising:
identifying a relay flag in the data forwarding request, wherein the relay flag indicates a reason for requesting a relay; and
determining a priority level for the relay request based on the reason for requesting the relay.

23. An apparatus for wireless communication by a first user equipment (UE), comprising:
a processor of the UE,
memory coupled with the processor; and
instructions stored in the memory and executable by the processor to cause the apparatus to:
monitor one or more parameters associated with a trigger condition, wherein the trigger condition is associated with a first communication link between the first UE and a network device;
receive a signal report from a second UE, wherein the signal report indicates one or more parameters associated with a third communication link between the second UE and the network device, and wherein the one or more parameters associated with the third communication link comprise a received signal strength indicator, a reference signal received power, a reference signal received quality, or any combination thereof;
detecting an occurrence of the trigger condition based at least in part on the monitoring and the signal report;
establish a sidelink communication link, the sidelink communication comprising a second communication link between the first UE and the second UE;
transmit a relay request to the second UE via the sidelink communication link based at least in part on the trigger condition, wherein the relay request comprises a request for the second UE to relay communications between the first UE and the network device; and communicate with the network device via the sidelink communication link based at least in part on the relay request.

24. The apparatus of claim 23, wherein the instructions to establish the sidelink communication link are executable by the processor to cause the apparatus to:
transmit a data forwarding request to the network device via the first communication link or the sidelink communication link, wherein the data forwarding request comprises an instruction for the network device to use the second UE to relay communications between the network device and the first UE.

25. The apparatus of claim 23, wherein the instructions are further executable by the processor to cause the apparatus to:
determine a transmit power usage for the first communication link, wherein the trigger condition is based at least in part on the transmit power usage.

* * * * *